United States Patent
Kim et al.

(10) Patent No.: US 12,181,294 B2
(45) Date of Patent: Dec. 31, 2024

(54) APPARATUS AND METHOD FOR PROVIDING ROUTE IN WIRELESS COMMUNICATION SYSTEM

(71) Applicant: Samsung Electronics Co., Ltd., Suwon-si (KR)

(72) Inventors: Jongtae Kim, Suwon-si (KR); Youngky Kim, Suwon-si (KR); Donghyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 869 days.

(21) Appl. No.: 16/971,884

(22) PCT Filed: Feb. 22, 2019

(86) PCT No.: PCT/KR2019/002217
§ 371 (c)(1),
(2) Date: Aug. 21, 2020

(87) PCT Pub. No.: WO2019/164338
PCT Pub. Date: Aug. 29, 2019

(65) Prior Publication Data
US 2021/0116255 A1 Apr. 22, 2021

(30) Foreign Application Priority Data

Feb. 23, 2018 (KR) .................. 10-2018-0022273
May 25, 2018 (KR) .................. 10-2018-0059872

(51) Int. Cl.
*G01C 21/34* (2006.01)
*H04W 4/44* (2018.01)
(Continued)

(52) U.S. Cl.
CPC ..... *G01C 21/3461* (2013.01); *G01C 21/3492* (2013.01); *H04W 4/44* (2018.02);
(Continued)

(58) Field of Classification Search
None
See application file for complete search history.

(56) References Cited

U.S. PATENT DOCUMENTS

2010/0088025 A1 4/2010 Garg et al.
2013/0024107 A1 1/2013 Kie et al.
(Continued)

FOREIGN PATENT DOCUMENTS

CA 2 973 452 A1 1/2018
CN 1482750 A 3/2004
(Continued)

OTHER PUBLICATIONS

Extended European Search Report dated Oct. 29, 2020, issued in European Patent Application No. 19756629.2.
(Continued)

*Primary Examiner* — Tuan C To
*Assistant Examiner* — David Ruben Pedersen
(74) *Attorney, Agent, or Firm* — Jefferson IP Law, LLP

(57) ABSTRACT

An electronic device is provided. The electronic device includes a management apparatus for providing a route in a wireless communication system that includes: at least one transceiver; and at least one processor operatively connected to the at least one transceiver, wherein: at least one processor receives service information related to a service, receives cell information related to a first cell and second cells provided by a first cellular network and a second cellular network, respectively, and provides the electronic device with a service route which includes at least one second cell among the second cells and is determined on the basis of the service information and the cell information; and the service is provided by the at least one second cell.

14 Claims, 18 Drawing Sheets

(51) Int. Cl.
  *H04W 40/02* (2009.01)
  *H04W 40/36* (2009.01)
  *H04W 84/18* (2009.01)

(52) U.S. Cl.
  CPC .......... *H04W 40/02* (2013.01); *H04W 40/36* (2013.01); *H04W 84/18* (2013.01)

(56) References Cited

U.S. PATENT DOCUMENTS

| | | | |
|---|---|---|---|
| 2017/0069209 A1* | 3/2017 | Beaurepaire | G08G 1/091 |
| 2017/0086054 A1 | 3/2017 | Azevedo et al. | |
| 2017/0086128 A1 | 3/2017 | Venkatraman et al. | |
| 2018/0299280 A1* | 10/2018 | Kumar | G01C 21/3694 |

FOREIGN PATENT DOCUMENTS

| | | |
|---|---|---|
| CN | 105091889 A | 11/2015 |
| EP | 3203188 A1 | 8/2017 |
| EP | 3 751 874 A1 | 12/2020 |
| KR | 10-0837755 B1 | 6/2008 |
| KR | 10-2015-0073574 A | 7/2015 |
| WO | 2015/108819 A1 | 7/2015 |
| WO | 2019/164338 A1 | 8/2019 |

OTHER PUBLICATIONS

Indian Office Action dated Jul. 6, 2022, issued in Indian Patent Application No. 202037036331.
European Office Action dated Aug. 24, 2022, issued in European Patent Application No. 19756629.2.
Korean Office Action dated Nov. 2, 2021, issued in Korean Patent Application No. 10-2018-0059872.
Chinese Office Action dated Nov. 25, 2021, issued in Chinese Patent Application No. 201980014765.1.
Korean Office Action dated May 25, 2021, issued in Korean Patent Application No. 10-2018-0059872.
European Office Action dated Jun. 14, 2021, issued in European Patent Application No. 19 756 629.2.
Indian Hearing Notice dated Dec. 15, 2023, issued in Indian Patent Application No. 202037036331.
European Office Action dated Aug. 31, 2023, issued in European Patent Application No. 19756629.2.

* cited by examiner

APPARATUS AND METHOD FOR PROVIDING ROUTE IN WIRELESS COMMUNICATION SYSTEM

CROSS-REFERENCE TO RELATED APPLICATION(S)

This application is a U.S. National Stage application under 35 U.S.C. § 371 of International application number PCT/KR2019/002217, filed on Feb. 22, 2019, which is based on and claimed priority of a Korean patent application number 10-2018-0022273, filed on Feb. 23, 2018, in the Korean Intellectual Property Office, and of a Korean patent application number 10-2018-0059872, filed on May 25, 2018, in the Korean Intellectual Property Office, the disclosure of each of which is incorporated by reference herein in its entirety.

TECHNICAL FIELD

The disclosure generally relates to a wireless communication system and, more particularly, to an apparatus and method for providing a movement route of an electronic device in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

DISCLOSURE OF INVENTION

Technical Problem

Based on the foregoing discussion, the disclosure provides an apparatus and method for providing a route in a wireless communication system.

The disclosure provides the apparatus and method for providing a route that guarantees a data transmission rate required in the wireless communication system.

The disclosure provides the apparatus and method for providing a route according to a user's preference in the wireless communication system.

The disclosure provides the apparatus and method for transferring, to a user, detailed information related to movement in the wireless communication system.

The disclosure provides the apparatus and method for providing a route on the basis of information for each section of the route in the wireless communication system.

The disclosure provides the apparatus and method for adaptively providing a route on the basis of information on cells provided in real time in the wireless communication system.

According to various embodiments of the disclosure, a management device for providing a route in a wireless communication system may include: at least one transceiver; and at least one processor operatively coupled to the at least one transceiver, wherein: at least one processor receives service information related to a service to be provided to an electronic device, receives cell information related to second cells provided by a second cellular network, which are different from a first cell provided by a first cellular network, and provides the electronic device with a service route including at least one second cell among the second cells, which is determined based on the service information and the cell information; and the service is provided by the at least one second cell.

According to various embodiments of the disclosure, an operation method of a management device for providing a route in a wireless communication system may include: receiving service information related to a service to be provided to an electronic device; receiving cell information related to second cells provided by a second cellular network, which are different from a first cell provided by a first cellular network; and providing the electronic device with a service route including at least one second cell among the second cells, which is determined based on the service information and the cell information, wherein the service is provided by the at least one second cell.

The apparatus and method according to various embodiments of the disclosure may enable an optimal route for a user to be provided, by considering a zone in which a high data transmission rate is guaranteed.

The apparatus and method according to various embodiments of the disclosure may enable a personalized route for each user to be provided, by considering information for each section of the route from a source to a destination.

The apparatus and method according to various embodiments of the disclosure may enable more detailed route information to be provided to a user, by acquiring higher capacity information.

Effects obtainable from the disclosure may not be limited to the above mentioned effects, and other effects which are not mentioned may be clearly understood, through the following descriptions, by those skilled in the art to which the disclosure pertains.

BEST MODE FOR CARRYING OUT THE INVENTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to an apparatus and method for providing a smooth service to a mobile electronic device by using a 5G communication system. Specifically, the disclosure describes a technique for providing a movement route of an electronic device, which is suitable for a service required by a user, by considering a zone in which a 5G communication system is provided.

Terms referring to a region (e.g., an area, a zone, a location, and a cell), terms referring to signaling (e.g., a message, a signal, and information), terms referring to a network entity (e.g., a server, a management device, a base station, a cloud, and a multi-access edge computing (MEC) device (or an MEC server)), and terms referring to elements of an apparatus, which are used in the following description are exemplified for the convenience of description. Therefore, the disclosure is not limited to the terms described below, and other terms having equivalent technical meanings may be used.

The disclosure describes various embodiments by using terms used in some communication specifications (e.g., a 3rd generation partnership project (3GPP) and an institute of electronical and electronics engineers (IEEE)), but this is merely illustrative. Various embodiments may also be easily modified and applied to other communication systems.

Figure 1:
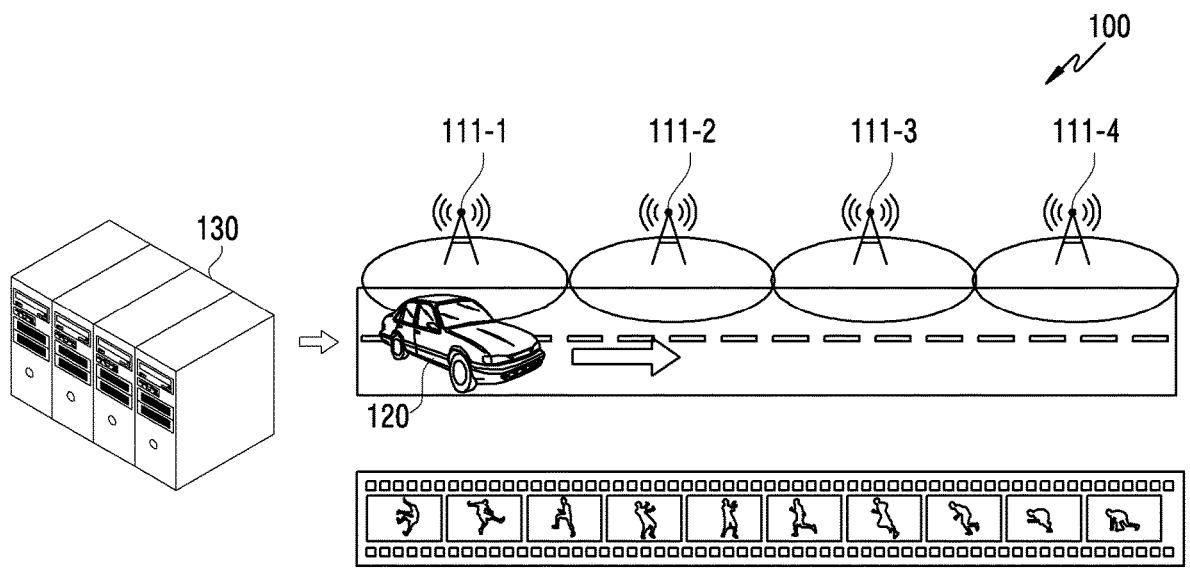
FIG. 1 illustrates a wireless communication environment according to various embodiments of the disclosure.
Figure 1:
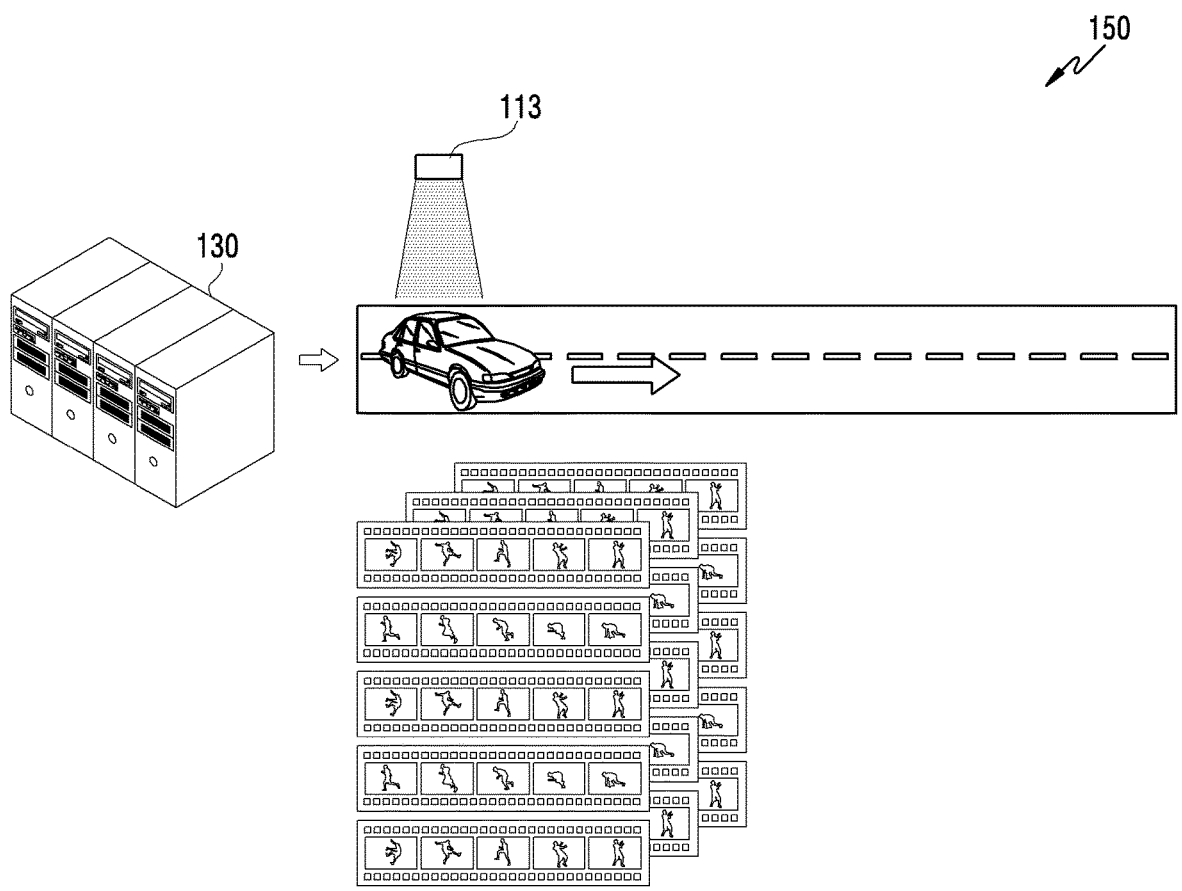

FIG. 1 illustrates a wireless communication environment according to various embodiments of the disclosure. Hereinafter, the term "cell" to be used may refer to a service coverage area of a base station. A base station may cover one cell or multiple cells. FIG. 1 illustrates first type base stations 111-1 to 111-4, a second type base station 113, an electronic device 120, and a management device 130, as some of nodes that use a channel in a communication system.

Referring to FIG. 1, the first type base stations 111-1 to 111-4 or the second type base station 113 is a network infrastructure that provides wireless access to the electronic device 120. The first type base stations 111-1 to 111-4 or the second type base station 113 has a coverage defined by a certain geographic area on the basis of a distance in which a signal can be transmitted. The first type base stations 111-1 to 111-4 or the second type base station 113 may be referred to as an "access point (AP)", an "eNodeB (eNB)", a "wireless point" or other terms having equivalent technical meaning, in addition to a base station. The second type base station 113 may be further referred to as a "5th generation node (5G node)", a "5G NodeB (NB)", a "wireless point", and a "transmission/reception point (TRP)", a "distributed unit (DU)", a "radio unit (RU)", "remote radio equipment (remote radio head, RRH)", or other terms having an equivalent technical meaning. FIG. 1 illustrates that the second type base station 113 provides a service to the electronic device 120, but the second type base station 113 may provide the service to the electronic device 120 via one or more independent devices (e.g., TRP) connected to the second type base station 113.

The electronic device 120 communicates with the first type base stations 111-1 to 111-4 or the second type base station 113 via a wireless channel. In some embodiments, the electronic device 120 is a device used by a user, and may be a device configured to provide a user interface (UI). For example, the electronic device may be a terminal equipped on a vehicle for driving. In some other embodiments, the electronic device 120 may be a device that performs machine type communication (MTC) operated without involvement of a user, or may be an autonomous vehicle. The electronic device 120 may be referred to as, in addition to an electronic device, a "terminal", a "vehicle terminal", a "user equipment (UE)", a "mobile station", and a "subscriber station", a "remote terminal", a "wireless terminal", a "user device", or other terms having equivalent technical meaning.

The management device 130 may be a device that provides route information to the electronic device 120. The route information may include not only information on a route for the electronic device 120 to move from a source to a destination, but also all information that can provide convenience for the electronic device 120 to move (e.g., drive). For example, the management device 130 may be a server of a navigation system. For example, the management device 130 may be a device connected to a cloud for the navigation system. In this case, the management device 130 may use a cloud system to provide a route to the electronic device 130.

In a first zone 100, while driving through the route, the electronic device 120 is provided with a service in a normal zone provided by the first type base stations 111-1 to 111-4. The electronic device 120 is provided with a service by sequentially passing through normal cells. A cell indicates an area, i.e., coverage, which can be covered by the first type base stations 111-1 to 111-4. A normal zone is a normal cell having a lower capacity than a hot zone described below, and may be provided by the same communication system as that of the hot zone or by other communication systems. For example, a normal cell is provided via the same radio access technology (RAT) as that of a hot cell, but there may be a difference in a required data rate or latency. In another example, a normal cell may be provided via a radio access technology differing from that of a hot cell.

Hereinafter, in the disclosure, a normal zone is used to describe a concept that contrasts to a hot zone. The entire service area except for a hot zone may be referred to as a normal zone. A normal zone may include normal cells. For example, a normal zone may use a narrow bandwidth compared to a hot zone.

In a second zone 150, while driving through a route, the electronic device 120 is provided with a service in a hot zone provided by the second type base station 113. A hot zone may refer to an area which provides a higher data rate than a normal zone, provides an ultra-low latency service, or provides a service specific to a corresponding hot zone. By using a hot zone, the electronic device 120 may receive data at high speed even when moving, and the electronic device 120 is provided with a service with high level of security and quality (e.g., quality of service (QoS)) assurance.

According to various embodiments, a hot zone may be referred to as a super cell, an enhanced cell, an advanced cell, a 5G cell, a 5G hot cell, a 5G hot spot, a new radio (NR) zone, an NR cell, a beamforming cell, a giga cell, a special cell, a special zone, and the like. Super cells in a hot zone may refer to cells provided by a cellular network that is different from a normal cell, for example, a 5G communication network. For example, a hot zone may include a cell provided in a 6 gigahertz (Hz) band or higher. For example, a hot zone may use a millimeter wave (mmWave) of 28 GHz. That is, a hot zone may refer to a zone in which a 5G communication system is supported. Hereinafter, in the disclosure, the 5G communication system refers to a system different from a 4G communication system (e.g., long term evolution (LTE), advanced (LTE-A), and WiMAX), a 3G communication system (e.g., wideband code division multiple access (WCDMA)), or a 2G communication system (e.g., global system for mobile communications (GSM), and code division multiple access (CDMA)).

By using a hot zone, the electronic device 120 may receive data at a high speed even when moving. The second type base station 113 providing a hot zone may provide the electronic device 120 with tens of Gbps data in the hot zone in a short time. In addition, by using a cellular network, the electronic device 120 is provided with a service with a high level of security and quality (e.g., QoS) assurance. That is, unlike the first zone 100 in which data is received at a constant speed while sequentially moving normal cells, in the second zone 150, the electronic device 110 may receive, in a short time, a significantly larger amount of data than data received via the hot zone in the first zone 100.

Since stability, reliability, and a high speed are guaranteed, various services may be provided in the hot zone. In order to provide various services to a user smoothly, the management device 130 may provide a route by using information related to the hot zone. The management device 130 may provide a route for providing an optimal service to a user of the electronic device 120, by using information related to the hot zone. Additionally, the management device 130 may provide a service route more appropriate for the user by further considering user preferences, services provided to the electronic device 120, and the like.

Although not illustrated in FIG. 1, edge computing may be used. In addition to the hot zone, a MEC device may be used as a network entity that provides a service to the electronic device 120. The MEC device may be a server mounted at a local base station close to a user terminal. Data transmitted by the electronic device 120 (e.g., a vehicle) in the hot zone or data transmitted by a 5G base station to the electronic device 120 may be relatively high capacity information (e.g., high definition (HD) map information and sensor information). According to various embodiments, the MEC device may receive and process high capacity information for the electronic device 120 and may transmit the processed information to the electronic device 120. Also, the MEC device may transmit data of the electronic device 120 to other devices (e.g., a navigation server or a cloud). Since information related to movement of the electronic device 120 is meaningful information at a current location of the electronic device 120, it may be efficient to process the information by the MEC device. The MEC device may provide ultra-low latency service or content to the electronic device 120.

Hereinafter, in the disclosure, in order to describe route provision according to various embodiments, an example, in which a management device searches for a route and a user of an electronic device selects a discovered route or a route provided according to determination of the electronic device, is described. However, the disclosure does not exclude that all or a part of route providing operations of the management device may be performed by the electronic device. That is, according to various embodiments, a route search may be performed in the electronic device, and route information may be provided to the user. To this end, the management device may provide a terminal with necessary information for determination of the route.

Figure 2:
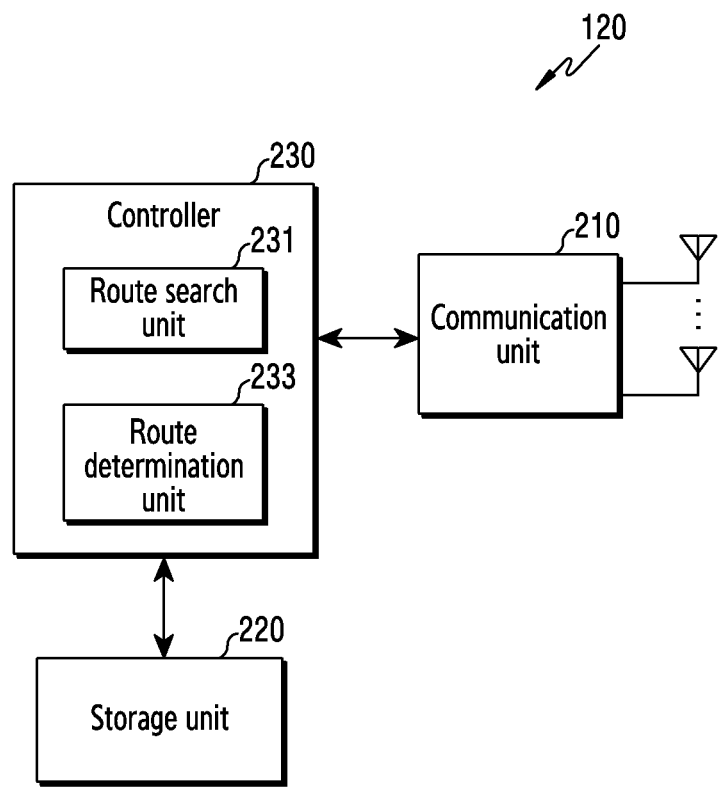
FIG. 2 illustrates an example of a configuration of an electronic device according to various embodiments of the disclosure.

FIG. 2 illustrates an example of a configuration of an electronic device according to various embodiments of the disclosure. The configuration illustrated in FIG. 2 may be understood as the configuration of the electronic device 120. The terms "-unit", "-device", etc. used hereinafter refer to a unit that processes at least one function or operation, which may be implemented by hardware or software, or a combination of hardware and software.

Referring to FIG. 2, the electronic device 120 includes a communication unit 210, a storage unit 220, and a controller 230.

The communication unit 210 performs functions for transmitting or receiving a signal via a wireless channel. For example, the communication unit 210 performs conversion between a baseband signal and a bitstream according to a physical layer specification of a system. For example, when transmitting data, the communication unit 210 generates complex symbols by encoding and modulating a transmission bitstream. When receiving data, the communication unit 210 restores a received bitstream by demodulating and decoding the baseband signal. The communication unit 210 up-converts the baseband signal into an RF band signal, transmits the up-converted RF band signal via an antenna, and then down-converts the RF band signal received via the antenna into a baseband signal. For example, the communication unit 210 may include a transmission filter, a reception filter, an amplifier, a mixer, an oscillator, a DAC, an ADC, and the like.

Further, the communication unit 210 may include a plurality of transmission/reception paths. Further, the communication unit 210 may include at least one antenna array including multiple antenna elements. In terms of hardware, the communication unit 210 may include a digital circuit and an analog circuit (e.g., a radio frequency integrated circuit (RFIC)). The digital circuit and the analog circuit may be implemented in a single package. The communication unit 210 may include a plurality of RF chains. Further, the communication unit 210 may perform beamforming. In order to give directivity according to a configuration of the controller 230 to a signal to be transmitted or received, the communication unit 210 may apply a beamforming weight to the signal.

Further, the communication unit 210 may transmit or receive a signal. The communication unit 210 may receive a downlink signal. The communication unit 210 may transmit an uplink signal. The communication unit 210 may include different communication modules to process signals of different frequency bands. Furthermore, the communication unit 210 may include a plurality of communication modules to support a plurality of different radio access technologies. For example, different radio access technologies may include Bluetooth low energy (BLE), wireless fidelity (Wi-Fi), Wi-Fi gigabyte (WiGig), cellular networks (e.g., long term evolution (LTE), pre-5G, and new radio (NR)), and the like. Further, the different frequency bands may include a super high frequency (SHF) (e.g., 2.5 Ghz and 5 Ghz) band and a millimeter wave (e.g., 28 GHz, 38 GHz, 60 GHz, etc.) band.

The communication unit 210 transmits and receives a signal as described above. Accordingly, all or a part of the communication unit 210 may be referred to as a "transmitter", a "receiver", or a "transceiver". In the following description, transmission and reception performed via a wireless channel are used in a sense including processing performed as described above by the communication unit 210.

The storage unit 220 stores data, such as a default program, an application program, and configuration information for operations of the electronic device 120. The storage unit 220 may include a volatile memory, a nonvolatile memory, or a combination of a volatile memory and a nonvolatile memory. The storage unit 220 provides stored data in response to a request of the controller 230. According to various embodiments, the storage 220 may store map information. The map information may be used to identify a route through which the electronic device 120 moves. In the disclosure, the map information may include map contents of various capacities for each capacity (e.g., low-capacity map information and high-capacity map information). For example, the electronic device 120 may acquire low-capacity map information from a cell having a relatively low service rate. As another example, the electronic device 120 may obtain high-capacity map information in a cell having a relatively high service speed, such as the hot zone described in FIG. 1. The high-capacity map information may be HD map information. Here, the HD map information refers to information on a high-precision map that represents a road, a road-related infrastructure, or surrounding terrain information within an error of a specific range (e.g., about 10 cm to 20 cm). Based on the HD map information, each of lanes on a determined route may be distinguished. According to various embodiments, the storage unit 220 may store cell information. Cell information may be used to find a route that is most suitable for service provision among possible routes. According to various embodiments, the storage 220 may store service information for the electronic device 120. For example, the service information may include information on an item required to service the electronic device 120, information on a destination, information on a configuration of the electronic device 120 for providing a service, and the like. According to various embodiments, the storage 220 may include traffic information related to the electronic device 120.

The controller 230 controls overall operations of the electronic device 120. For example, the controller 230 transmits and receives a signal via the communication unit 210. Further, the controller 230 records and reads data in the storage unit 220. The controller 230 may perform functions of a protocol stack required by the communication standard. To this end, the controller 230 may include at least one processor or a micro-processor, or may be a part of a processor. A part of the communication unit 210 and controller 230 may be referred to as a CP. The controller 230 may include various modules for performing communication.

According to various embodiments, the controller 230 may include a route search unit 231 and a route determination unit 233. The route search unit 231 may configure a default route or routes different from the default route, to search for a route including a hot zone. The route search unit 231 may configure a default route or routes different from the default route, to search for a route according to a specific purpose. The route determination unit 233 may determine one of the discovered routes according to a user's selection or satisfaction of a designated algorithm. The route determination unit 233 may provide information on the determined route to a user (e.g., a display and a UI). The electronic device 120 may move through the determined route. Here, the route search unit 231 and the route determination unit 233 are codes or a set of instructions stored in the storage unit 220, and may be instructions/codes at least temporarily residing in the controller 230 or storage spaces storing the instructions/codes, or may be a part of circuitry constituting the controller 230, or a module for performing a function of the controller 230. According to various embodiments, the controller 230 may control the electronic device to perform operations in accordance with the following various embodiments.

The configuration of the electronic device illustrated in FIG. 2 is merely an example, and the electronic device is not limited from the configuration illustrated in FIG. 2. That is, according to various embodiments, some elements may be added, deleted, or changed.

Figure 3:
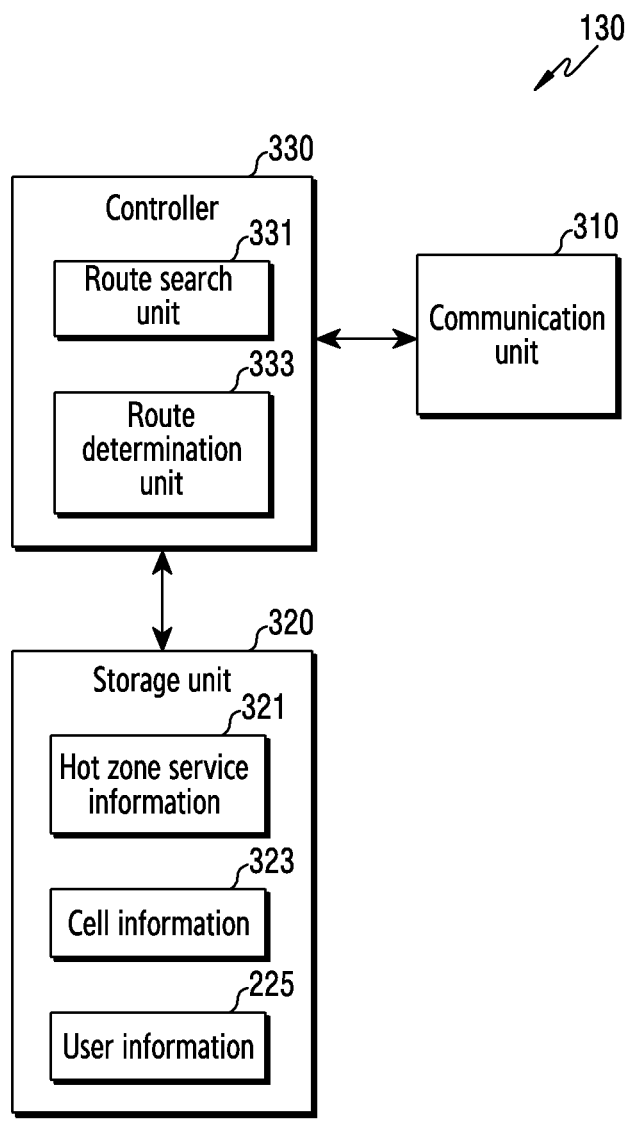
FIG. 3 illustrates an example of a configuration of a management device according to various embodiments of the disclosure.

FIG. 3 illustrates an example of a configuration of a management device according to various embodiments of the disclosure. The configuration illustrated in FIG. 3 may be understood as the configuration of the management device 130. The terms "-unit", "-device", etc. used hereinafter refer to a unit that processes at least one function or operation, which may be implemented by hardware or software, or a combination of hardware and software.

Referring to FIG. 3, the management device 130 includes a communication unit 310, a storage unit 320, and a controller 330.

The communication unit 310 may perform functions for transmitting or receiving a signal in a wired communication environment. The communication unit 310 may include a wired interface for controlling a direct connection between devices via a transmission medium (e.g., a copper wire and an optical fiber). For example, the communication unit 310 may transfer an electrical signal to another device through a copper wire, or may perform conversion between an electrical signal and an optical signal.

The communication unit 310 may perform functions for transmitting or receiving a signal in a wireless communication environment. For example, the communication unit 310 may perform conversion between a baseband signal and a bitstream according to a physical layer specification of the system. For example, when transmitting data, the communication unit 310 may generate complex symbols by encoding and modulating a transmission bitstream. When receiving data, the communication unit 310 may restore a received bitstream by demodulating and decoding the baseband signal. Further, the wireless communication unit 310 may up-convert the baseband signal to a radio frequency (RF) band signal, may transmit the RF band signal via an antenna, and may down-convert the RF band signal received via the antenna to a baseband signal. To this end, the communication unit 310 may include a transmission filter, a reception filter, an amplifier, a mixer, an oscillator, a digital-to-analog converter (DAC), an analog-to-digital converter (ADC), etc. Also, the communication unit 310 may include a plurality of transmission/reception paths. The communication unit 310 may include a digital unit and an analog unit, wherein the analog unit includes multiple sub-units according to an operation power, an operation frequency, and the like.

The communication unit 310 transmits and receives a signal as described above. Accordingly, all or a part of the communication unit 310 may be referred to as "a transmission unit", "a reception unit", or "a transmission/reception unit". Transmission and reception performed in the following description are used in a sense including processing performed as described above by the wireless communication unit 310.

The storage unit 320 stores data, such as configuration information, an application program, and a basic program for operations of the management device 130. The storage unit 320 may include a volatile memory, a nonvolatile memory, or a combination of a volatile memory and a nonvolatile memory. The storage unit 320 provides stored data in response to a request of the controller 330. According to various embodiments, the storage unit 320 may include beam information. The beam information may include information for identification of a beam of the electronic device. According to various embodiments, the storage unit 320 may include beam-specific channel information. For example, the electronic device may store a measurement result for a signal when receiving the signal by using a beam of the electronic device. According to various embodiments, the storage unit 320 may store hot zone service information 321. The hot zone service information 321 may include information on a service that can be provided in a hot zone provided by a cellular network of a mobile communication operator. According to various embodiments, the storage unit 320 may store cell information 323. The cell information 323 may include information on a cell location, a cell capacity, etc., as information on cells provided by the cellular network of the mobile communication operator. Here, the cells include a cell, which forms a hot zone, i.e., a super cell by a 5G cellular network. Therefore, the cell information 323 according to various embodiments may include information on a location of a hot zone and information on a capacity or real-time use amount in a hot zone, and the like. The management device 130 may receive the hot zone service information 321 or the cell information 323 from a cloud or a server of a mobile communication operator. According to various embodiments, the storage unit 320 may store user information 325. The user information 325 refers to information related to a user of an electronic device (e.g., the electronic device 120) which receives a route by the management device 130. The user information 325 may include preferences related to route selection of a user, frequency of use of a route including a hot zone, service information used during driving by the user, and the like.

The controller 330 controls overall operations of the management device 130. For example, the controller 330 transmits and receives a signal via the communication unit 310. Further, the controller 330 records and reads data in the storage unit 320. The controller 330 may perform functions of a protocol stack required by the communication standard. To this end, the controller 330 may include at least one processor or a micro-processor, or may be a part of a processor. A part of the communication unit 310 and controller 330 may be referred to as a CP. The controller 330 may include various modules for performing communication.

According to various embodiments, the controller 330 may include a route search unit 331 and a route determination unit 333. The route search unit 331 and the route determination unit 333 correspond to the route search unit 231 and the route determination unit 233 of the electronic device 120, and therefore detailed descriptions of overlapping elements are omitted. The route search unit 331 and the route determination unit 333 are codes or a set of instructions stored in the storage unit 320, and may be instructions/codes at least temporarily residing in the controller 330 or storage spaces storing the instructions/codes, or may be a part of circuitry constituting the controller 330, or a module for performing a function of the controller 330. According to various embodiments, the controller 330 may control the electronic device to perform operations in accordance with the following various embodiments.

The configuration of the management device illustrated in FIG. 3 is merely an example, and the configuration of the management device is not limited from the configuration illustrated in FIG. 3. That is, according to various embodiments, some elements may be added, deleted, or changed.

A normal zone and a hot zone are defined with reference to FIG. 1, route providing environments according to various embodiments of the disclosure are described, and configurations of an electronic device and a management device of the disclosure are described with reference to FIG. 2 and FIG. 3. Hereinafter, the disclosure describes a method for providing an optimal service to a user by providing a route based on a hot zone via FIG. 4 to FIG. 14.

Figure 4:
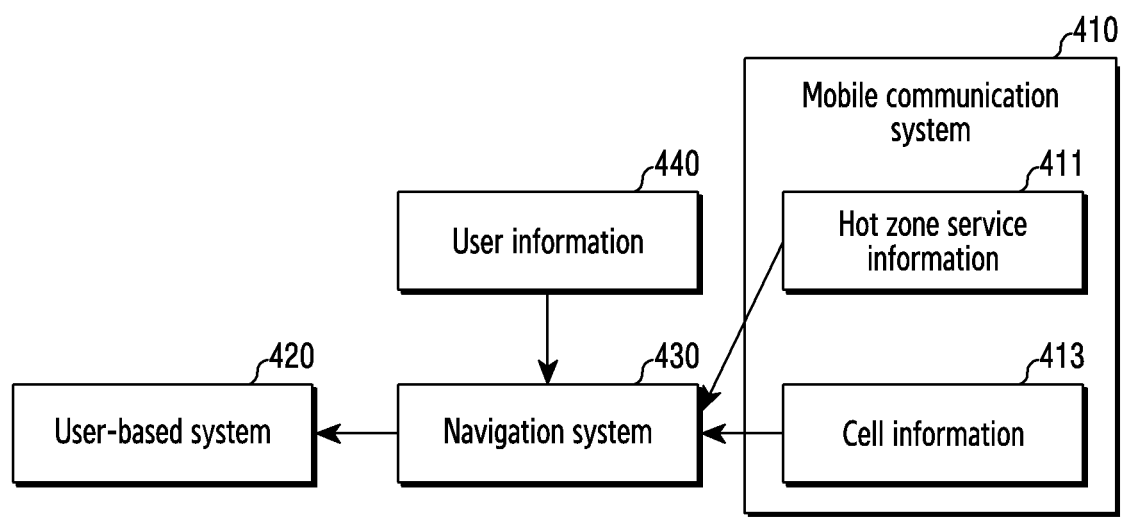
FIG. 4 illustrates an example of a system for providing a route according to various embodiments of the disclosure.

FIG. 4 illustrates an example of a system for providing a route according to various embodiments of the disclosure. Hereinafter, in the disclosure, providing of a route refers to an operation of providing information on a route, i.e., route information, for providing a service to a user of a moving electronic device. That is, providing of the route includes a configuration in which the management device or the electronic device searches for a route, a configuration in which the discovered route is determined according to an algorithm selected or designated by a user, and a configuration in which route information is provided to the electronic device according to the determined route.

Referring to FIG. 4, signaling between systems for providing a route is illustrated. Systems for providing a route according to the disclosure may include a mobile communication system 410, a user-based system 420 and a navigation system 430.

The mobile communication system 410 is a system operated by a mobile communication operator. The mobile communication system 410 provides a cellular network via cells. The mobile communication system 410 may provide information on a hot zone having a relatively high data rate, that is, hot zone service information 411. The hot zone service information 411 may include information on a service provided in a hot zone. The hot zone service information 411 is high capacity map information and may include dynamic map information or HD map information. The HD map information may be used to determine an optimal lane or recommended speed. Here, the optimal lane may be a lane having a largest value of a specific parameter (e.g., a moving speed) from among lanes on a predetermined route. The recommended speed may be a fastest speed that satisfies a limit condition (e.g., a speed limit and a vehicle performance limit) in a corresponding lane. According to various embodiments, a hot zone, that is, a 5G base station, may provide a navigation system with information related to the optimal lane and recommended speed, at which a driver should drive, on the basis of the HD map information.

The mobile communication system 410 may provide information related to supported cells, which is cell information 413. The cell information 413 may include information related to deployment of cells operated by a mobile communication operator, information on a location of each cell, a cell capacity of each cell, a load per cell, a usage in each cell, a state of each cell (e.g., whether each cell operates normally), etc. According to various embodiments, the cells may include a cell providing a hot zone. That is, the cell information 413 may include a location of a hot zone, a real-time capacity in the hot zone, a real-time usage in the hot zone, a state of the hot zone (e.g., whether the hot zone operates normally), etc.

The user-based system 420 is a system receiving a cellular service provided by the mobile communication operator 410, and a system receiving route information provided by a navigation system 430 described below, and the user-based system 420 is a system related to a user of an electronic device. That is, the electronic device may be a device included in the user-based system 420. For example, the electronic device may be a portable electronic device. For another example, the electronic device may be a car system (or infotainment system) which is equipped on a vehicle so as to be operatively coupled with control devices in the vehicle.

The navigation system 430 is a system that is operated by an operator providing a navigation service. The navigation system 430 acquires map-related information and traffic-related information. In addition, the navigation system 430 may acquire the hot zone service information 411 and the cell information 413 from the mobile communication system 410. The navigation system 430 may search for routes for a user based on the obtained information, may transfer the discovered routes to the user system 420, or may provide the user system 420 with information on the route determined based on the obtained information. A management device may be a device included in the navigation system. For example, the management device may be a server by an operator providing a navigation service. According to various embodiments, by receiving information related to an optimal lane and recommended speed, and HD map information received from a hot zone, that is, a 5G base station, the management device may transfer the optimal lane and recommended speed information of a driving route to a user of the electronic device.

Unlike what is illustrated in FIG. 4, if a mobile communication operator and an operator providing a navigation service are the same, a signaling procedure (e.g., transmission of hot zone service information 411 and cell information 413) between the mobile communication system 410 and the navigation system 430 may be omitted.

Figure 5A:
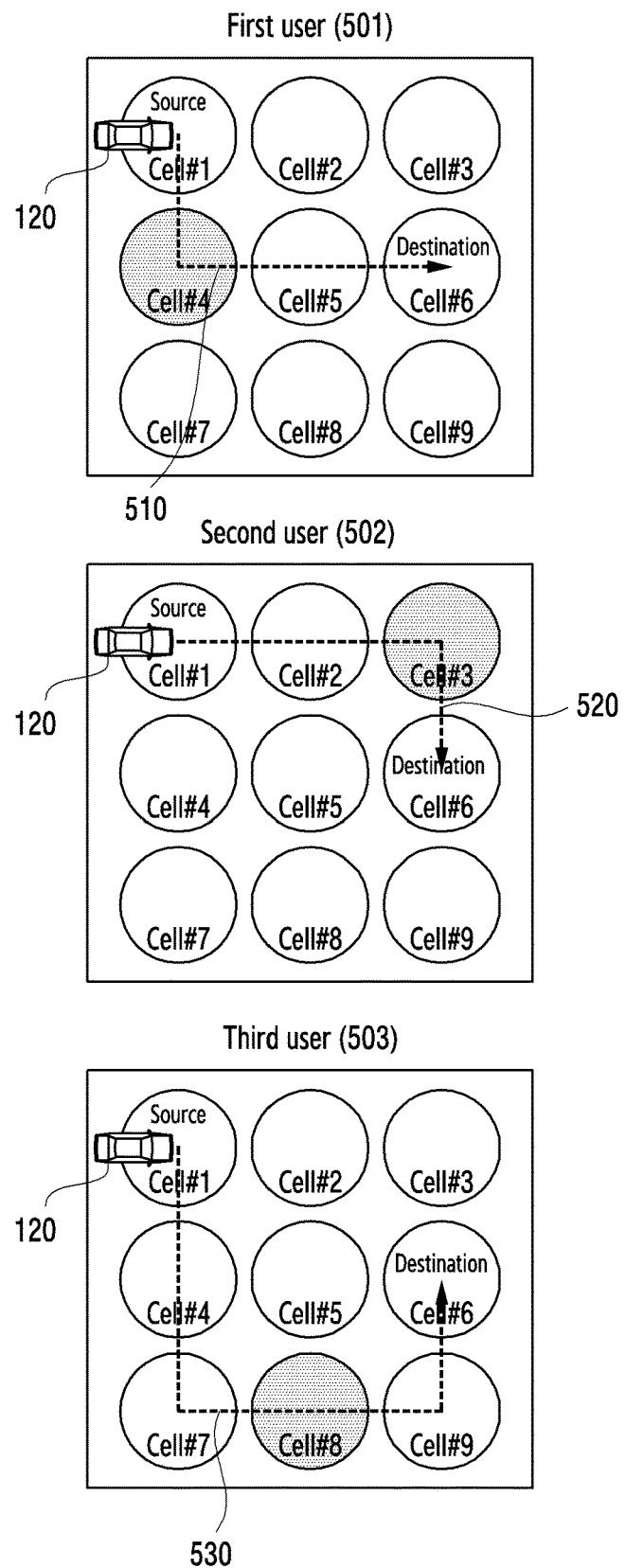
FIG. 5A illustrates an example of a service route according to various embodiments of the disclosure.

FIG. 5A illustrates an example of a service route according to various embodiments of the disclosure. Since stability, reliability, and a high speed are guaranteed, various services may be provided in the hot zone. FIG. 5A describes an example in which a service route is changed if a service selected by each user is different when a service provided for each hot zone is different.

Referring to FIG. 5A, the electronic device 120 may move from cell #1 to cell #6. The electronic device 120 may use a navigation service to move from cell #1 to cell #6. A management device (not illustrated) may acquire movement information (source: cell #1, and destination: cell #6) of the electronic device 120. The management device may receive information on a service, i.e., service information, to be provided while the electronic device 120 is moving. The management device may determine a route based on the movement information and service information. Hereinafter, described is an example in which different routes are determined by selecting different services by a first user 501, a second user 502, and a third user 503, respectively.

The first user 501 may select an image service. For example, the electronic device 120 may transmit or receive a high-definition (e.g., ultra-high definition (MD)) image. If a file download for a high-definition movie is provided in cell #4, the management device 130 may configure a first route 510 so that the electronic device 120 arrives at cell #6 from cell #1 via cell #4. Meanwhile, according to an embodiment, even if the file download in cell #4 is not completed, the electronic device 120 may re-receive a packet, which has failed to be completely downloaded, in normal cells (e.g., cell #5 and cell #6). According to an embodiment, regardless of cell #4 that is a super cell, the electronic device 120 may download a content, which is provided by the super cell, even in normal cells.

The second user 502 may select an autonomous driving service. For example, the electronic device 120 may receive information on a dynamic map for autonomous driving. If download of the dynamic map is provided from cell #3, the management device 130 may configure the second route 520 so that the electronic device 120 arrives at cell #6 from cell #1 via cell #3.

The third user 503 may select an upload service. For example, the electronic device 120 may transmit or receive vehicle sensor data for collecting of information. For the electronic device 120, if a seamless upload environment (e.g., an upload speed is 10 times faster than that in a normal cell) of data is provided in cell #8, the management device 130 may configure the second route 520 so that the electronic device 120 arrives at cell #6 from cell #1 via cell #8.

As illustrated in FIG. 5A, the management device may generate a route for each user by additionally utilizing cell deployment information and user information of the mobile communication network as well as hot zone service information, and may provide a recommended route to a user.

Figure 5B:
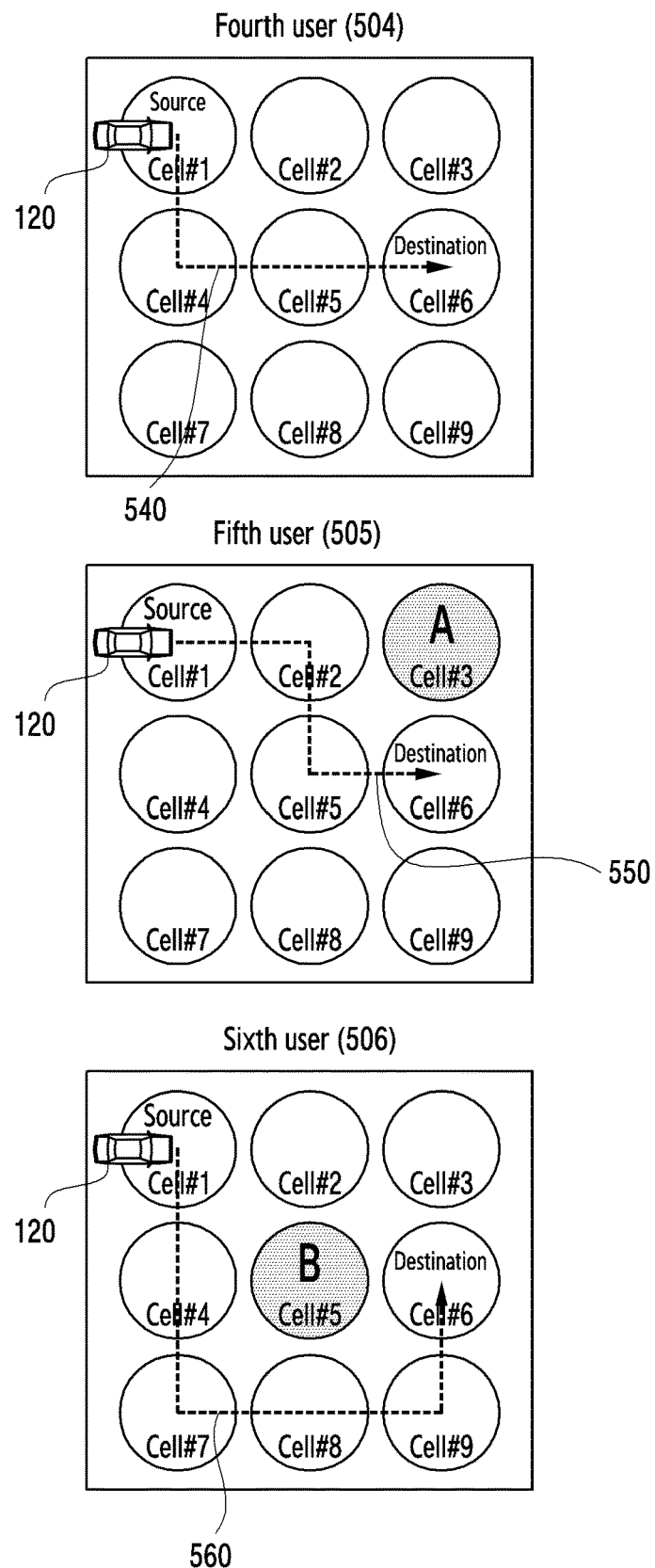
FIG. 5B illustrates an example of a service route based on an operation mode according to various embodiments of the disclosure.

FIG. 5B illustrates an example of a service route based on an operation mode according to various embodiments of the disclosure. Data on characteristics of sections for constitution of a service route may be collected. By establishing a database related to the characteristics of the sections, a service route according to a specific purpose may be provided. In FIG. 5B, an example, in which a service route is changed based on an operation mode according to a purpose, is described. Hereinafter, it is described that an operation mode is determined via an input on a user's electronic device or the operation mode is selected, but the disclosure is not limited thereto. The operation mode may be determined by the electronic device according to a predetermined algorithm or user information.

Referring to FIG. 5B, the electronic device 120 may move from cell #1 to cell #6. The electronic device 120 may use a navigation service to move from cell #1 to cell #6. A management device (not illustrated) may acquire movement information (source: cell #1, and destination: cell #6) of the electronic device 120. The management device may receive information on a service, i.e., service information, to be provided while the electronic device 120 is moving. The management device may determine a route based on the movement information and service information. Hereinafter, described is an example in which different routes are determined by selecting different operation modes by a fourth user 504, a fifth user 505, and a sixth user 506, respectively.

The fourth user 504 can select a high speed mode. The management device may provide the electronic device 120 with a route for the fastest movement from a source to a destination. The management device may search for a route for the fastest movement by using information on a moving speed. The information on the moving speed may include statistical information on a moving speed of a vehicle in a corresponding section, a speed limit specified in the section, information on a vehicle density in the section, etc. According to an embodiment, the management device may identify the fourth route 540 as a route that takes a shortest time from among a plurality of candidate routes connecting from the source to the destination on the basis of statistical information on the moving speed for each section. The management device may configure the fourth route 540 so that the electronic device 120 arrives at cell #6 from cell #1 via cell #4. The management device may configure the fourth route 540 as a service route, and may provide configured route information to the electronic device 120. The fourth route 540 may be referred to as a fastest route.

The management device may receive HD map information on the navigation system. The management device may generate the fastest route including lane information and speed information. The management device may generate lane information indicating a specific lane among lanes on the fastest route, and speed information indicating a speed recommended in the specific lane. The management device may provide the generated lane information and speed information to the electronic device 120. The electronic device 120 may display the lane information and the speed information according to the fastest route on the HD map information of the navigation system. The electronic device 120 may provide a user with driving information (e.g., a route guide from the source to the destination) for the fastest route along with the lane information and speed information.

The fifth user 505 may select a fuel efficiency mode. The management device may provide the electronic device 120 with a route obtained by considering fuel efficiency when moving from the source to the destination. The management device may search for a most efficient route by using fuel efficiency information. Fuel efficiency information may include statistical information about fuel efficiency for each section, fuel efficiency information in a corresponding section for each vehicle type, road information (e.g., whether there is a traffic light, and whether there is a crosswalk) in the section. According to an embodiment, the management device may identify the fifth route 550 as a route (that is, a best fuel efficiency route) that consumes the least fuel compared to a distance from among a plurality of candidate routes connecting the source to the destination, on the basis of statistical information on fuel efficiency for each section. The management device may configure the fifth route 550 so that the electronic device 120 arrives at cell #6 from cell #1 via cell #2 and cell #5. The fifth route 550 may be referred to as an eco route. The management device may identify the eco route so as to avoid a section in which fuel consumption over distance is equal to or more than a threshold value, among a plurality of routes and a section, in which fuel is consumed the most, among target sections. For example, the management device may configure the fifth route 550 in which the cell #3 is not included, so as to cause the electronic device 120 to bypass section A in which the electronic device 120 consumes much fuel over distance.

The management device may receive HD map information on the navigation system. The management device may generate an eco route including lane information and speed information. The management device may generate lane information indicating a specific lane among lanes on the eco route, and speed information indicating a speed recommended in the specific lane. The management device may provide the generated lane information and speed information to the electronic device 120. The electronic device 120 may display the lane information and the speed information according to the eco route on the HD map information of the navigation system. The electronic device 120 may provide a user with driving information (e.g., a route guide from the source to the destination) for the eco route along with the lane information and speed information.

The sixth user 506 may select a safety mode. The management device may provide the electronic device 120 with a route based on information related to an accident when moving from the source to the destination. Here, the information related to an accident may include information on an accident occurrence rate, information on a type of the accident, information on an extent of the accident, and the like. According to an embodiment, the management device may configure the sixth route 560 to bypass section B including a section in which an accident occurrence rate is higher than a threshold value among a plurality of routes. For example, when the electronic device 120 selects the safety mode, the management device may configure the sixth route 560 that does not include cell #5 in order to avoid section B in which the accident occurrence rate is higher than the threshold value. The management device may configure the sixth route 560 so that the electronic device 120 arrives at cell #6 from cell #1 via cell #4, cell #7, cell #8, and cell #9.

According to another embodiment, the management device may configure the sixth route 560 to bypass a section having a highest occurrence rate among a plurality of routes. For example, when the electronic device 120 selects the safety mode, the management device may configure the sixth route 560 that does not include cell #5 in order to avoid section B having a highest occurrence rate. The management device may configure the sixth route 560 so that the electronic device 120 arrives at cell #6 from cell #1 via cell #4, cell #7, cell #8, and cell #9. The sixth route 560 may be referred to as a safety route.

According to another embodiment, the management device may determine a representative value of the accident occurrence rate for each of the plurality of candidate routes connecting from the source to the destination, on the basis of information on the accident occurrence rate. The representative value of the accident occurrence rate may be an average of accident occurrence rates for respective sections in the route, or may be a maximum value of the accident occurrence rates for the respective sections. The management device may configure the sixth route 560 as a route having a lowest representative value of accident occurrence rates from among the plurality of candidate routes.

The management device may receive HD map information on the navigation system. The management device may generate the safety route including lane information and speed information. The management device may generate lane information indicating a specific lane among lanes on the safety route, and speed information indicating a speed recommended in the specific lane. The management device may provide the generated lane information and speed information to the electronic device 120. The electronic device 120 may display the lane information and the speed information according to the safety route on the HD map information of the navigation system. The electronic device 120 may provide a user with driving information (e.g., a route guide from the source to the destination) for the safety route along with the lane information and speed information.

In FIG. 5B, when HD map information is received, an operation for generating lane information and speed information and providing the generated information to the electronic device by the management device has been described as an example. However, the disclosure is not necessarily limited thereto. For example, the management device may provide only information on a specific lane among lanes of a corresponding route. For example, the management device may provide only speed information for the route without lane information. In this case, the speed information may include speed information for each of the lanes of the route.

In FIG. 5B, each of the high speed mode, the fuel efficiency mode, and the safety mode is described as an example, but it is needless to say that other operation modes in consideration of characteristics for each section may be additionally considered in addition to the above modes. According to various embodiments, two or more modes may be combined. The management device may apply weights according to characteristics (e.g., a speed, a fuel efficiency, and an accident occurrence rate) according to the operation mode. The management device may configure, as a service route, a route having a highest sum of weighted values for respective characteristics from among a plurality of routes that connect from a source to a destination. According to various embodiments, a new operation mode may be defined based on a combination of weights for respective characteristics. Here, the operation mode may correspond to a specific service. In other words, a combination of predetermined weights for respective services may be mapped. Such mapping information may be stored in units of service layers in a navigation server or a server providing a service.

In FIG. 5B, a geographic area separated by a cell is described as an example of a section for managing characteristics, but the disclosure is not necessarily limited thereto. For example, a section for each route may be a concept included in a cell or a concept including a cell. For example, each section may be distinguished according to a physical range managed by a database or a block distinguished on a map.

Figure 6:
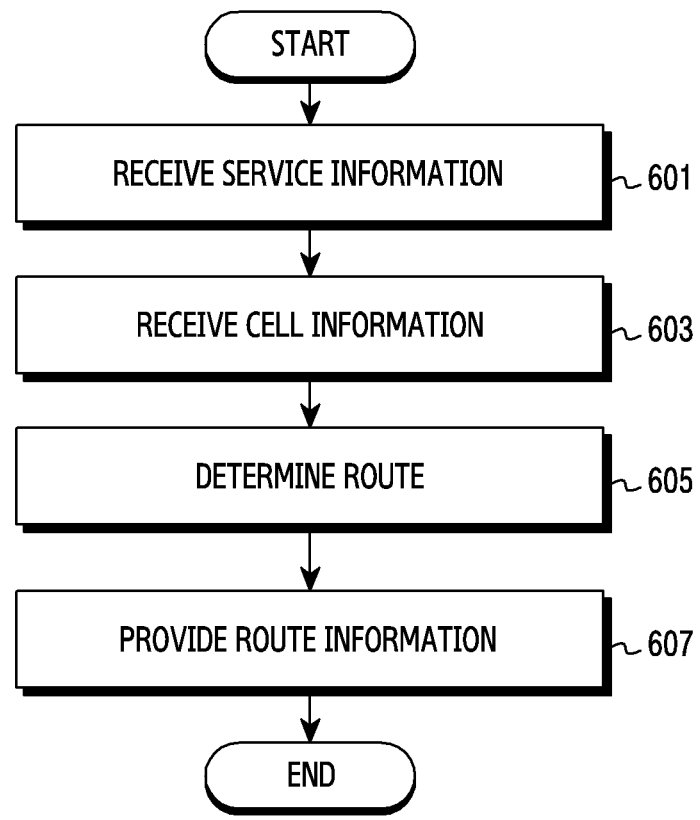
FIG. 6 illustrates a flowchart of the management device for providing a route according to various embodiments of the disclosure.

FIG. 6 illustrates a flowchart of the management device for providing a route according to various embodiments of the disclosure. FIG. 6 illustrates an operation method of the base station 130.

Referring to FIG. 6, in operation 601, the management device may receive service information. The management device may receive the device information from an electronic device. The service information refers to predetermined information or information configured by the electronic device so that the electronic device configures a route (a service route) for receiving a smooth service. That is, the service information may include information relating to user requirements.

According to various embodiments, the service information may include information on a mode selected by a user. Here, the mode is specified according to which parameter weight is configured to be high to provide the service, when a route is determined. A parameter may be determined based on at least one of rate, real-time, or speed.

According to various embodiments, the service information may include information on an operation mode of the electronic device. According to an embodiment, the operation mode may be specified according to which characteristic among the characteristics of respective sections to be used or which characteristic is to be assigned with more weights, in order to identify a route for a specific purpose. For example, as described in FIG. 5B, the characteristic of each section may include a vehicle speed, a fuel efficiency for each section, and an accident occurrence rate for each section. The operation mode may include a high speed mode, a fuel efficiency mode, and a safety mode.

According to various embodiments, the service information may include information on a configuration of the electronic device. For example, if the electronic device includes a display and the service is an image service, the service information may include information on a size (e.g., 5×10 inches) and resolution (e.g., 4K, 8K, or UHD) of the display.

According to various embodiments, the service information may include an allowable range. The allowable range refers to a range of the difference between another route and a reference route. For example, the allowable range may be expressed as a time limit value. The time limit value refers to an allowable excess time from a shortest time if a shortest route from a source to a destination is a default route. When searching for a route other than the default route, other routes are limited to routes in which a driving time does not exceed the allowable excess time. For example, the allowable range may be expressed as a quality limit value.

In operation 603, the management device may receive cell information. The cell information is related to cells according to a cellular communication system, and may include a location of a hot zone and information relating to real-time capacity/usage/state in the hot zone, as well as cell deployment information related to locations of respective cells. The management device may receive cell information on the mobile communication system of a mobile communication operator. According to various embodiments, in order to determine a route according to a real-time cell situation, the management device may periodically receive cell information from a mobile communication operator. For example, the management device may periodically receive cell information from a server of the mobile communication operator.

As another example, the management device may receive cell information when an event occurs (e.g., information change).

In operation 605, the management device may determine a route based on service information and cell information. The route may be referred to as a hot zone-based route or a service route for service provision. The hot zone-based route refers to a route including a hot zone. The management device may determine routes based on the service information and the cell information.

The management device may obtain a type of a service provided to the electronic device, on the basis of the service information. The management device may acquire a data amount or channel capacity required to provide the service, on the basis of the service information and predefined information. The management device may acquire available channel capacity for routes necessary for service provision. According to an embodiment, the channel capacity for service provision may be determined according to the number of hot zones. The management device may search for routes according to the allowable range, and may determine, as a service route, a route enabling service provision from among discovered determined routes.

For example, the management device may identify predefined information according to a mode, which is obtained based on service information. Here, the predefined information refers to information for determination of the amount of data required to provide the service per unit time according to a selected mode. The predefined information may include a data transmission rate required to provide a seamless service. The data rate may be defined in the form of a required data amount per unit time according to the size and resolution of the display of the electronic device. For example, in a situation where a capacity of a 4K UHD movie file with a running time of 2 hours or more is 18 gigabytes (Gbytes)(=144 gigabits), it is defined that the electronic device needs a data rate of 20 Mbps for seamless viewing of the movie file. Assuming that a maximum processing capacity per typical LTE base station is about 30 Mbps, it is difficult theoretically for the LTE base station to service two or more electronic devices. Specifically, since a cellular network is frequently used by general smartphone users, provision of a movie service may be more difficult. However, in a case of the hot zone of the disclosure, since data may be, theoretically, downloaded at a maximum of 20 Gbps, the electronic device may successfully receive the movie file by going through a route including a hot zone.

The management device may acquire predefined information for route generation. The management device may determine a movement route from the source to the destination on the basis of the predefined information. Each route connecting from the source to the destination may be subdivided into multiple sections. The predefined information may include information on a characteristic of each section. According to various embodiments, the management device may obtain predefined information for route generation according to the operation mode obtained in operation 601. For example, in the safety mode, the management device may receive accident occurrence rate information for each section. For another example, in the fuel efficiency mode, the management device may receive information on a fuel efficiency for each section.

In operation 607, the management device may provide route information. The management device may provide route information for the service route. The route information is for identification of the route, and the management device may include information on a location including a hot zone, physical information of the route, a total estimated time required, a lane, a speed, and the like. The route information is for transferring the route to a user, and the management device may provide the electronic device with not only driving information (e.g., providing a route image on the display, and guiding the route by voice), but also information on a hot zone located around the route, an arrival time when using the route, and the like.

Figure 7A:
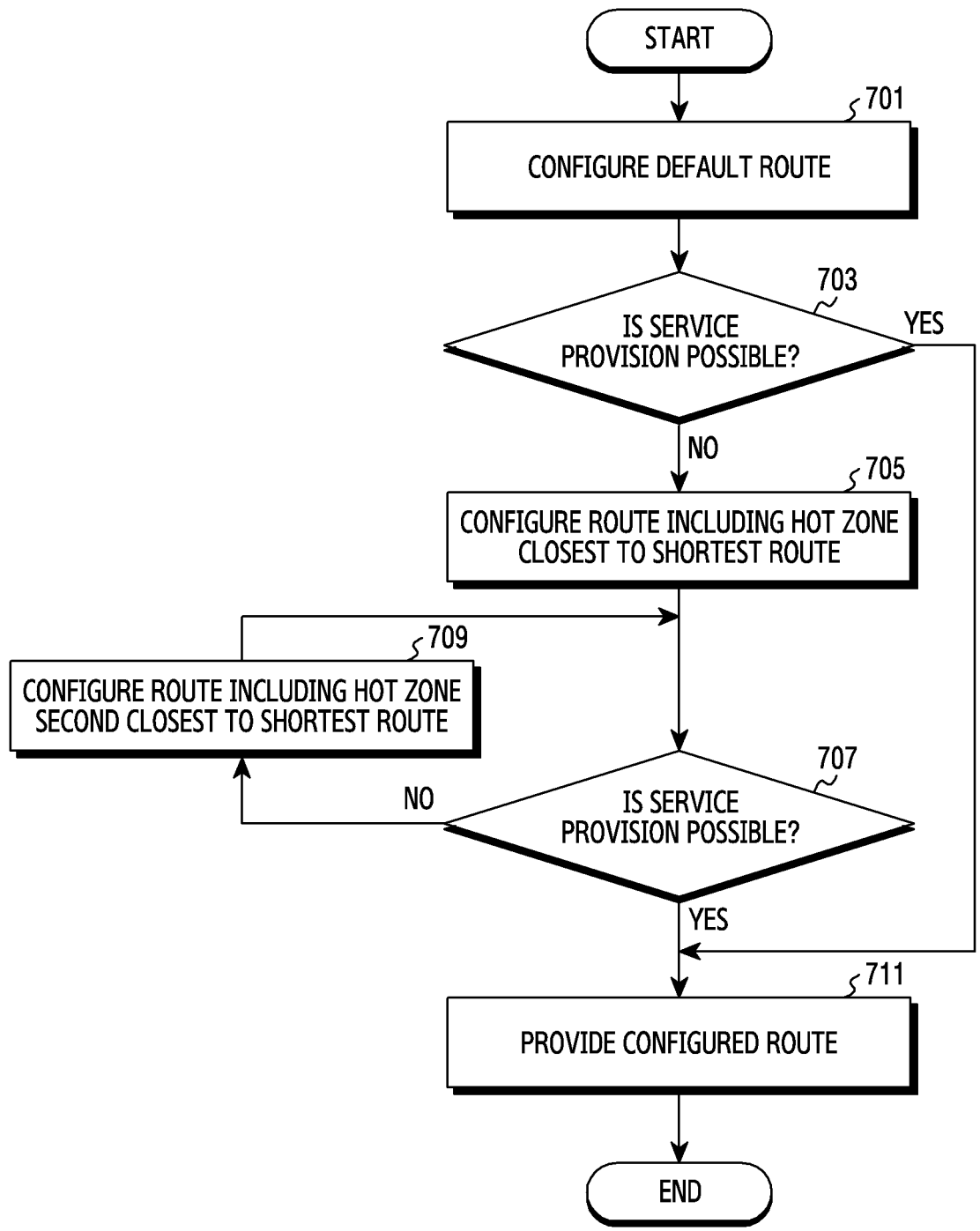
FIG. 7A illustrates a flowchart of a management device for determining a route according to various embodiments of the disclosure.

FIG. 7A illustrates a flowchart of a management device for determining a route according to various embodiments of the disclosure. FIG. 7A illustrates an operation method of the management device 130. FIG. 7A illustrates operations 605 and 607 of FIG. 6.

Referring to FIG. 7A, in operation 701, the management device may configure a default route. The default route may be determined according to a user configuration of the electronic device or may be determined according to a predesignated rule. For example, the default route may be determined to be a route having a shortest distance.

In operation 703, the management device may determine whether a service can be provided to the electronic device by using the default route. Determination of whether the service can be provided according to the route is determined depending on whether cells on the corresponding route can provide the service to the electronic device while a user requirement for the service is satisfied. For example, the management device may determine whether the service for the route can be provided, by comparing a required amount of data, which meets the requirement of the user, with an amount of data that can be received while driving the default route. If service provision is not possible using the default route, the management device may perform operation 705. If service provision is possible using the default route, the management device may perform operation 711.

In operation 705, the management device may configure a route going through a hot zone closest to the shortest route. The management device may identify the hot zone closest to the shortest distance. The management device may identify a route that includes the identified hot zone. According to an embodiment, the management device may configure the identified route. According to another embodiment, the management device may determine whether the identified route satisfies the allowable range defined in operation 601 of FIG. 6. The management device may configure the identified route when the identified route satisfies the allowable range. For example, the allowable range may be determined to be an absolute value. For example, the management device may configure each of routes having a driving time within a time exceeding 5 minutes compared to the driving time according to the default route. The management device may search for a route including a hot zone in which the service can be received "within a time required for the default route +5 minutes". For another example, the allowable range may be determined to be a relative value. For example, the management device may configure each of routes having a driving time within a time exceeding 10% of the driving time according to the default route. When the time required for the default route is 10 minutes, the management device may search for a route including a hot zone in which the service can be received within 11 minutes.

In operation 707, the management device may determine whether the service can be provided to the electronic device by using a configured route. The management device may determine whether cells on a configured route, i.e., at least one route which is different from the default route and includes a hot zone, provide an amount of data enabling service provision to the electronic device. Since the determination of operation 707 is equally applicable to the determination of operation 703, detailed descriptions of overlapping configurations are omitted. If the service is unable to be provided to the electronic device by using the configured route, the management device may perform operation 709. If the service can be provided to the electronic device by using the configured route, the management device may perform operation 711.

In operation 709, the management device may configure a route including a hot zone second closest to a shortest route. A hot zone closest to the shortest route does not meet a user requirement for the service, and therefore the management device may identify the route including a hot zone second closest to the shortest route. According to an embodiment, the management device may configure the identified route. According to another embodiment, the management device may determine whether the identified route satisfies an allowable range, as the allowable range in operation 705, and if the identified route satisfies the allowable range, the management device may configure the identified route.

In operation 711, the management device may provide the configured route. The management device may provide route information of the configured route to the electronic device. Accordingly, the electronic device may display the configured route.

In FIG. 7A, the hot zone closest to the shortest route may be determined according to various methods. In some embodiments, a hot zone having a shortest straight line distance from a spot of the hot zone to the shortest route may be determined to be the hot zone closest to the shortest route. In some other embodiments, among N (N is an integer) hot zones in an ascending order of a straight line distance from the hot zone to the shortest route, a hot zone, in which a driving time of a route including the hot zone is determined to be shortest, may be determined as the hot zone closest to the shortest route. Here, N may be fixed or can be adaptively adjusted. For example, when N is adaptively adjusted, N may be determined according to a required transmission rate, an allowable range, or a distance from the source to the destination.

According to the embodiment described with reference to FIG. 7A, a route including a hot zone, in which the service can be provided, may be provided. According to requirements of the service, a route enabling the service to be provided may be determined for a part of the entire route and provided. Alternatively, the route enabling the service to be provided may be determined for each of partial routes obtained by dividing the entire route, and provided. The requirements (e.g., a transmission rate) required for each of the partial routes may be the same or different.

Although not illustrated in FIG. 7A, if a specific condition is satisfied, the management device may determine that the service cannot be provided to the electronic device. According to an embodiment, the management device may provide the default route (e.g., a shortest route or a previously configured route). Since the management device is unable to provide the service by a hot zone, the default route may be provided regardless of whether the service is available. The management device may further transmit, to the electronic device, a message indicating that the service is unavailable.

Figure 7B:
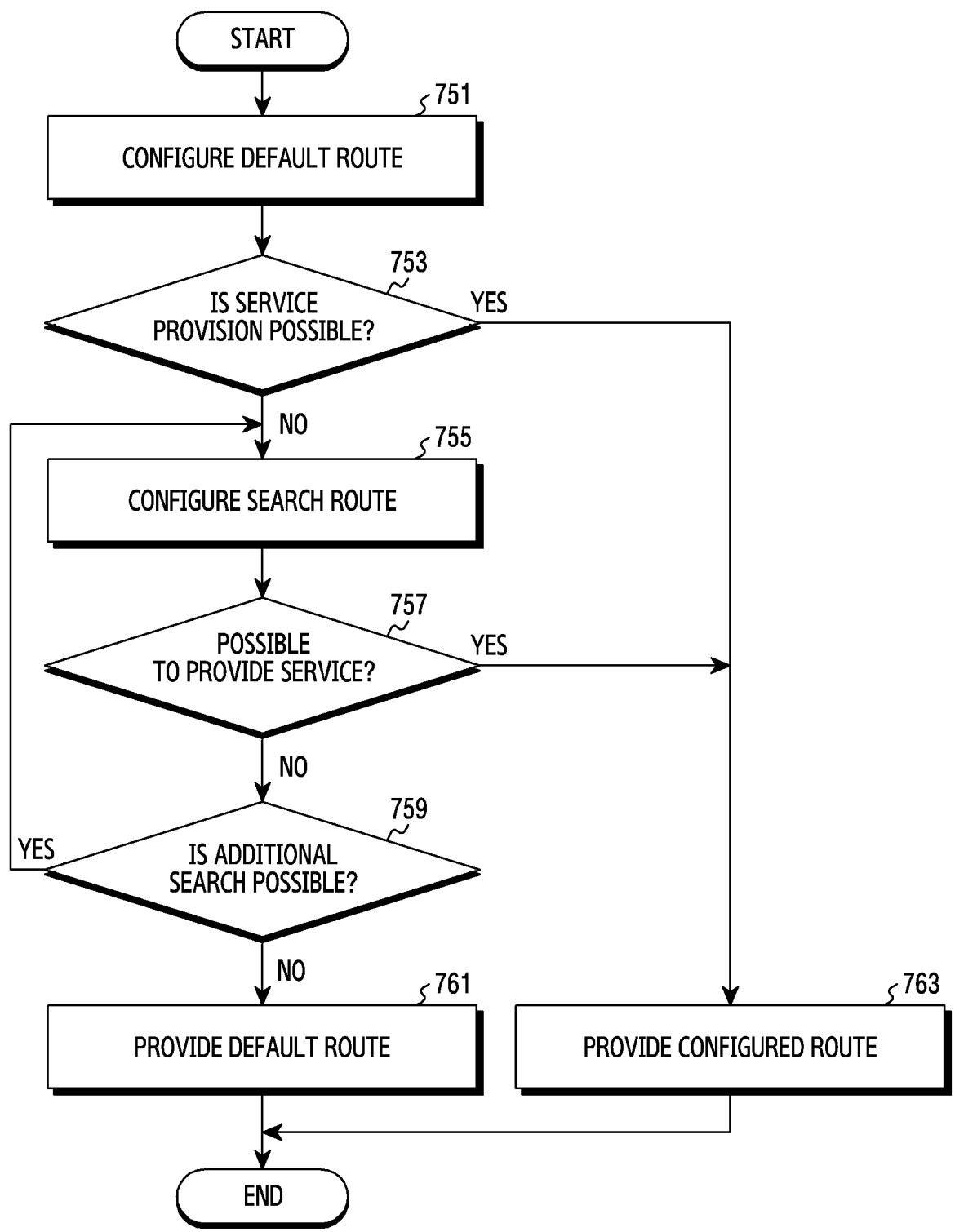
FIG. 7B illustrates another flowchart of the management device for determining a route according to various embodiments of the disclosure.

FIG. 7B illustrates another flowchart of the management device for determining a route according to various embodiments of the disclosure. FIG. 7B illustrates an operation method of the management device 130. FIG. 7B illustrates operations 605 and 607 of FIG. 6.

Referring to FIG. 7B, in operation 751, the management device may configure a default route. The description of operation 751 corresponds to operation 701 of FIG. 7A, and therefore detailed descriptions of overlapping configurations are omitted.

In operation 753, the management device may determine whether a service can be provided to the electronic device by using the default route. The description of operation 753 corresponds to operation 703 of FIG. 7A, and therefore detailed descriptions of overlapping configurations are omitted. If the service cannot be provided using the default route, the management device performs operation 755. If the service can be provided using the default route, the management device performs operation 763.

In operation 755, the management device may configure a search route. The search route is different from the default route, and refers to a candidate route for determination of whether the service is available. The management device is unable to provide a route for the service to the electronic device by using the default route, and therefore the management device may search for at least one other route. The management device may configure a search route as a route satisfying an allowable range. The description of the allowable range corresponds to operation 705 of FIG. 7A and therefore detailed descriptions of overlapping configurations are omitted.

In operation 757, the management device may determine whether the service can be provided to the electronic device by using the search route. The description of operation 757 corresponds to operation 707 of FIG. 7A, and therefore detailed descriptions of overlapping configurations are omitted. If the service cannot be provided using the search route, the management device performs operation 759. If the service can be provided using the search route, the management device performs operation 763.

In operation 759, the management device may determine whether an additional search is possible by further configuring the search route. The additional search refers to determining whether there is a search route that can be further configured in addition to the route discovered in operation 755 within a degree of difference compared to the default route, that is, within the allowable range. For example, if a time limit value of the allowable range is 15 minutes, the management device may configure the search route "within a time required for the default route+10 minutes". Thereafter, when operation 755 is performed again in a cycle, the management device may configure the search route "within a time required for the default route+15 minutes". That is, the management device according to various embodiments may configure the range of the search route stepwise within the allowable range so as to search for a hot zone-based route. For another example, if the allowable range is configured to be a relative value (e.g., a ratio), the management device may configure the search route "within a time required for the default route×(100+20)%". The management device may configure a ratio stepwise so as to search for the hot zone-based route. If the additional search is possible, the management device performs operation 755 again. If the additional search is impossible, the management device performs operation 761 again.

In operation 761, the management device may provide the default route. The management device may determine that the service cannot be provided to the electronic device. The management device may provide the default route (e.g., a shortest route or a previously configured route). That is, since the management device is unable to provide the service by a hot zone, the default route may be provided regardless of whether the service is available. Although not illustrated in FIG. 7B, the management device may further transmit, to the electronic device, a message indicating that the service is unavailable.

In operation 763, the management device may provide a configured route. If there are a plurality of configured search routes, the management device may identify a service route according to a specific criterion (e.g., time) from among the plurality of routes. For example, the management device may identify, as the service route, a route requiring a shortest time from among the plurality of routes. The management device may provide the identified route.

Figure 7C:
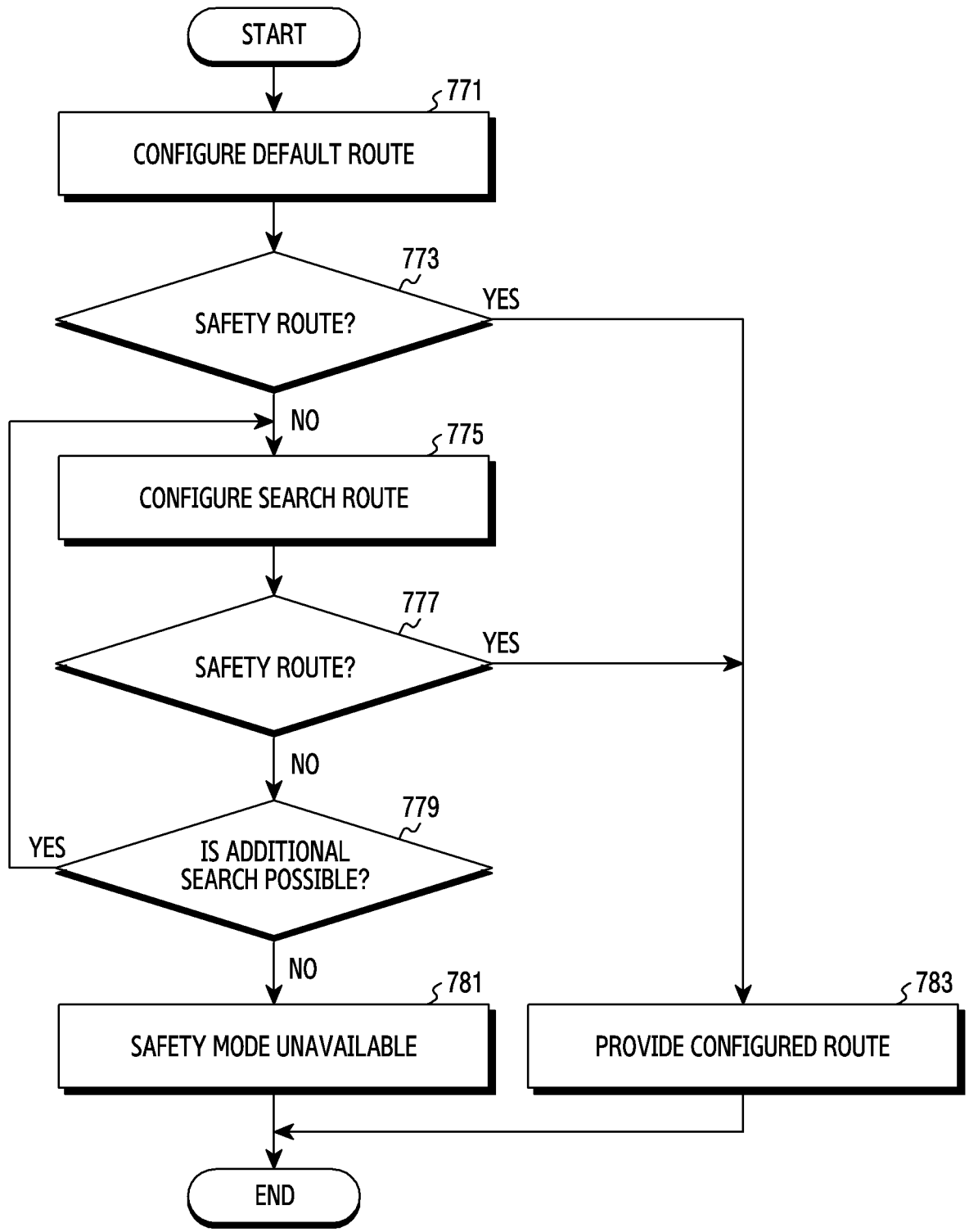
FIG. 7C illustrates another flowchart of the management device for determining a route according to various embodiments of the disclosure.

FIG. 7C illustrates another flowchart of the management device for determining a route according to various embodiments of the disclosure. 7C illustrates an operation method of the management device 130. FIG. 7C illustrates operations 605 and 607 of FIG. 6. FIG. 7C illustrates an operation flow of the management device for configuring a safety route.

Referring to FIG. 7C, in operation 771, the management device may configure a default route. The default route may be determined according to a user configuration of the electronic device or may be determined according to a predesignated rule. For example, the default route may be determined as a route having a shortest distance. For another example, the default route may be determined to be a route that enables a fastest travel from a source to a destination. As described above with reference to FIG. 5B, the management device may configure the default route on the basis of information related to a moving speed for each section.

In operation 773, the management device may determine whether the default path is a safety route. The management device may use the database to determine whether the default route is a safety route. The route from the source to the destination may be subdivided into multiple sections. The database may include at least one characteristic for each section. The database may be provided in the management device or a server accessible by the management device. At least one characteristic may include information related to an accident. The information related to an accident may include information on an accident occurrence rate, information on a type of the accident, information on an extent of the accident, and the like.

Information on the accident occurrence rate may include, for example, an accident occurrence rate per time slot. For example, information on the accident occurrence rate may include an accident occurrence rate based on weather. Depending on whether it is raining or snowing or the weather is sunny, the accident occurrence rate may be different in the same section. For example, information on the accident occurrence rate may include an accident occurrence rate according to a day when a specific event occurs. For example, the specific event may refer to a holiday period (e.g., Chuseok or New Year's Day) or a weekend.

Information on a type of an accident may include at least one of a target of damage and a type of a vehicle. For example, information on the type of the accident may indicate whether the accident is a person-to-vehicle accident or a collision accident between vehicles. Alternatively, information on the type of the accident may indicate a type of a vehicle having caused the accident (e.g., a passenger car, a bus, a van, etc.).

Information on the extent of the accident may indicate the extent of a financial or human damage. For example, information on the extent of the accident may include the number of deaths. For example, information on the extent of the accident may include the number of injuries. For example, information on the extent of the accident may include level information determined according to the number of deaths, the number of injuries, negligence, and the amount of financial damages caused by the accident.

The management device may determine whether each configured route is a safety route. A condition for determination of whether a route is a safety route may be referred to as the safety route. The management device may determine whether there is a route satisfying a safety condition from among routes connecting from the source to the destination. The management device may determine, as a safety route, a route satisfying the safety condition.

According to various embodiments, the management device may determine, as a safety route, a route that does not include a section, in which an accident occurrence rate is equal to or greater than a threshold value, from among sections related to a geographic location from the source to the destination. That is, the management device may identify a safety route so as to bypass a place where an accident occurrence rate is high. If the default route is not a safety route, the management device performs operation 775. If the default route is a safety route, the management device performs operation 783.

In operation 775, the management device may configure a search route. The search route refers to a candidate route for determination of whether a route differing from the default route is a safety route. Since the management device determines that the default route is not a safety route, the management device may search for at least one other route. The management device may configure a search route as a route satisfying an allowable range.

The management device may determine whether the identified route is a route satisfying the allowable range defined in operation 601 of FIG. 6. The management device may configure the identified route as a search route when the identified route satisfies the allowable range. For example, the allowable range may be determined to be an absolute value. For example, the management device may configure, as a search route, at least one route having a driving time within a time exceeding 5 minutes compared to the driving time according to the default route. The management device may search for a route corresponding to "within a time required for the default route+5 minutes". For another example, the allowable range may be determined to be a relative value. For example, the management device may configure, as the search route, at least one route having a driving time within a time exceeding 10% of the driving time according to the default route. When the time required for the default route is 10 minutes, the management device may search for at least one route in which a required time is within 11 minutes. The management device configures a discovered route as the search route.

In operation 777, the management device may determine whether the search route is a safety route. Whether the search route is a safety route may be determined according to the safety condition used in operation 773. If the search route is not a safety route, the management device performs operation 779. If the search route is a safety route, the management device performs operation 783.

In operation 779, the management device may determine whether an additional search is possible by further configuring the search route. The additional search refers to determining whether there is a search route that can be further configured in addition to operation 775 within a degree of difference compared to the default route, that is, within the allowable range. For example, if a time limit value of the allowable range is 15 minutes, the management device may configure the search route "within a time required for the default route+10 minutes". Thereafter, when operation 775 is performed again in a cycle, the management device may configure the search route "within a time required for the default route+15 minutes". That is, the management device according to various embodiments may configure the range of the search route stepwise within the allowable range so as to search for a safety route. For another example, if the allowable range is configured to be a relative value (e.g., a ratio), the management device may configure the search route "within a time required for the default route×(100+20)%". The management device may configure a ratio stepwise so as to search for a safety route. If the additional search is possible, the management device performs operation 775 again. If the additional search is impossible, the management device performs operation 781 again.

In operation 781, the management device may determine that a safety route cannot be provided to the electronic device. The management device may transmit, to the electronic device, a message indicating that a safe route cannot be provided. Although not illustrated in FIG. 7C, according to an embodiment, the management device may provide the default route (e.g., a shortest route and a fastest route) configured in operation 771.

In operation 783, the management device may provide a configured route. If there are a plurality of configured search routes, the management device may identify a service route according to a specific criterion (e.g., a time and an accident occurrence rate) from among the plurality of routes. For example, the management device may identify, as a service route, a route requiring a shortest movement time from among the plurality of routes. For another example, the management device may identify, as the service route, a route having a lowest accident occurrence rate among the plurality of routes. The management device may provide the identified route.

In FIG. 7C, it has been described that a route corresponding to an accident occurrence rate equal to or greater than a threshold value is determined to be a safety route, but the disclosure is not limited thereto. A safety route may be determined in various ways. In some embodiments, a safety route may have a lowest average accident occurrence rate for sections of respective routes among routes connecting from the source to the destination. In some embodiments, a safety route may have an average accident occurrence rate equal to or lower than a threshold value from among routes connecting from the source to the destination. In some other embodiments, a safety route may be a route that does not include a section having a highest accident occurrence rate from among routes connecting from the source to the destination.

FIG. 7C illustrates, as an example, a safety route in which the electronic device operates in a safety mode, but the embodiment illustrated in FIG. 7C may be applied depending on whether a discovered route is also a corresponding route (e.g., a fastest route or an eco route) in another operation mode (e.g., a fast route or a fuel efficiency mode).

Figure 8:
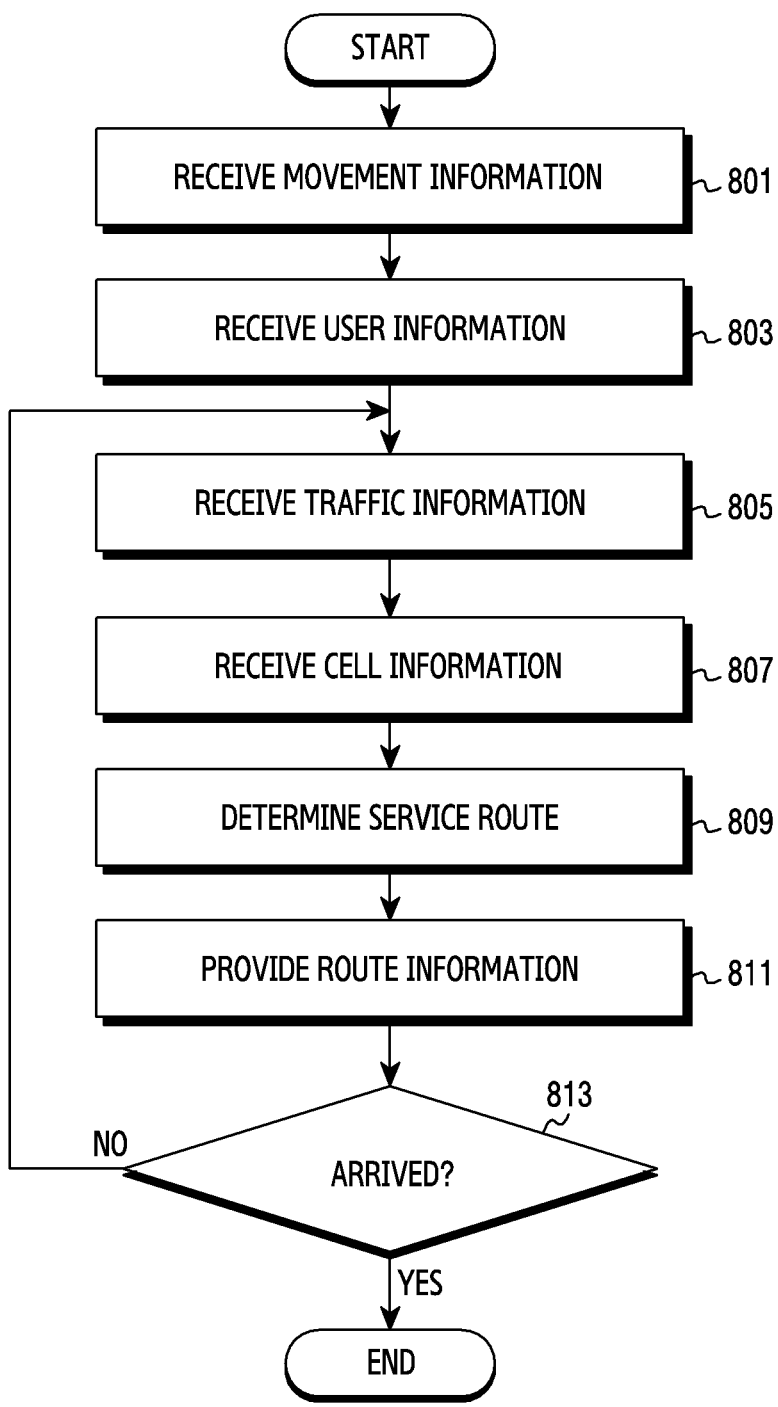
FIG. 8 illustrates a flowchart of the management device for movement according to various embodiments of the disclosure.

FIG. 8 illustrates a flowchart of the management device for movement according to various embodiments of the disclosure. FIG. 8 illustrates an operation method of the management device 130.

Referring to FIG. 8, in operation 801, the management device may receive movement information. The movement information includes information related to driving of the electronic device. For example, the movement information may include information on a departure time of the electronic device. For example, the movement information may include information on a source or information on a destination of the electronic device. The management device may obtain information on the source according to location information of the electronic device. The management device may obtain information on the destination according to feedback from the electronic device. Although not illustrated in FIG. 8, the management device may transmit a request message to the electronic device to display a user interface (UI) for inputting a destination, in order to receive the movement information.

In operation 803, the management device may receive user information. The user information refers to information related to behavior pattern of a user. A user behavior pattern refers to a tendency of information (e.g., determination, input, selection, and movement) in which a user's determination is involved among factors for determination of a service route. For example, the user information may be in the form of probability information for a specific determination.

According to various embodiments, the management device may receive user information from the electronic device. The electronic device may collect data for user information by storing a driving result whenever a user of the electronic device drives. The electronic device may manage the collected data in the form of probability depending on iteration, and may provide user information to the management device whenever the electronic device requests a new service route from the management device. According to various embodiments, the management device may receive user information from a big data-related server. The server may collect data on a driving result of a user of the electronic device as well as data on a driving result of another user in the same zone, and may collect data stored in other devices (e.g., Internet access information) in which the user is involved in addition to the electronic device. The server may design, for the collected data, a model for a plurality of service routes for each zone, hot zone, service, or user, and may manage the data by using weights and probabilities of the respective plurality of service routes and a deterministic method based thereon. The management device may obtain user information by requesting the user information from the server whenever a request for the service route is received from the electronic device.

In operation 805, the management device may receive traffic information. The traffic information is real-time road traffic information, and may include traffic jam information for each road, accident occurrence section information, and driving time information for a specific road section.

In operation 807, the management device may receive cell information. The cell information may include cell deployment information, capacity/usage information for each cell, and capacity/usage information of a hot zone. Since the cell information corresponds to the cell information in FIG. 6, detailed descriptions of the overlapping configurations are omitted.

In operation 809, the management device may determine a service route. The management device may determine the service route on the basis of the information received in operations 801 to 807. When a cycle is repeated, the management device may update the service route on the basis of information updated in real time in operations 805 to 807. By determining the service route by reflecting real-time traffic information and real-time cell information, the electronic device may be provided with a service suitable for an actual driving situation. According to various embodiments, when real-time cell information is updated, if a hot zone on the service route becomes a service collapse zone, the management device may provide information on at least one detour including another hot zone. The management device may further receive real-time road traffic information. The management device may determine a hot zone-based route (or a service route) on the basis of the service information, the cell information, and the real-time road traffic information. When the real-time traffic information, the cell deployment information, and the like are updated, the management device may determine another route when a serious traffic jam occurs in a specific area on the hot zone-based route.

In operation 811, the management device may provide route information. The route information may be information on the service route. The management device may provide the route information for the electronic device. According to various embodiments, the management device may transmit a message for inquiring of whether to drive using a determined service route, to the electronic device in the first cycle. When the determined service route includes a hot zone, the message may be used to determine whether to drive on the determined service route or on the default route. When the determined service route does not include a hot zone, that is, when the determined service route is the default route, the message may be used to determine whether to drive on the default route. Although not illustrated in FIG. 8, by responding to the message according to an input of the user of the electronic device, the management device may determine whether a driving route of the electronic device includes a hot zone.

The route information may include driving information. The driving information may include a guide for the route so that the electronic device moves from the source to the destination. The electronic device may provide a user with a guide for a corresponding route according to the received driving information. For example, the electronic device may provide a visual UI that guides a route. For example, the electronic device may provide a voice service that guides a route. The management device may provide driving information so that the electronic device moves smoothly along the service route until the electronic device arrives at the destination.

According to various embodiments, the route information may include high capacity map information. Additionally, the route information may include information on an optimal lane or a recommended speed based on the high capacity map information. That is, the management device may transmit information indicating the optimal lane or recommended speed to the electronic device. The optimal lane or the recommended speed may be determined based on various criteria. In some embodiments, the optimal lane may be a lane having a largest value of a moving speed from among lanes on a predetermined route. The recommended speed may be a fastest speed that satisfies a limit condition (e.g., a speed limit and a limit based on vehicle performance) in the optimal lane. For example, the management device may provide information indicating that two-lane driving at 70 km/h is optimal in a current section when the electronic device is moving on a four-lane road.

In some other embodiments, the management device may configure the optimal lane to be a lane having a lowest accident occurrence rate based on the traffic information of operation 805 and an accident occurrence rate from among the lanes on a determined route. For the recommended speed, a maximum speed, at which a limit condition (e.g., a speed limit or a limit according to vehicle performance) is satisfied in the optimal lane, may be the optimal speed.

In operation 813, the management device may determine whether the electronic device has arrived at the destination. When the electronic device arrives at the destination, the management device may terminate a procedure of updating and providing route information. If the electronic device has not arrived at the destination, the management device may perform operation 805 again.

In FIG. 8, it is described that traffic information and cell information are repeatedly received in each cycle, but the embodiment illustrated in FIG. 8 is merely an embodiment of the disclosure, and the disclosure is not limited thereto. For example, the management device may receive traffic information more frequently by configuring a reception period of the traffic information to be shorter than a reception period of cell information.

For another example, the management device may receive cell information more frequently by configuring a reception period of the cell information to be shorter than a reception period of traffic information. Unlike illustrated in FIG. 8, repeatedly receiving even user information as well as repeatedly receiving only traffic information and cell information, or repeatedly receiving one of traffic information and cell information may be also understood as an embodiment of the disclosure.

For another example, the management device may repeatedly receive only cell information and may modify a route in real time. For example, if the management device has determined that a first hot zone is included in the route, but a base station of the first hot zone becomes unable to operate normally, the management device may newly determine a route including a second hot zone instead of the first hot zone, and may provide a new route.

Figure 9A:
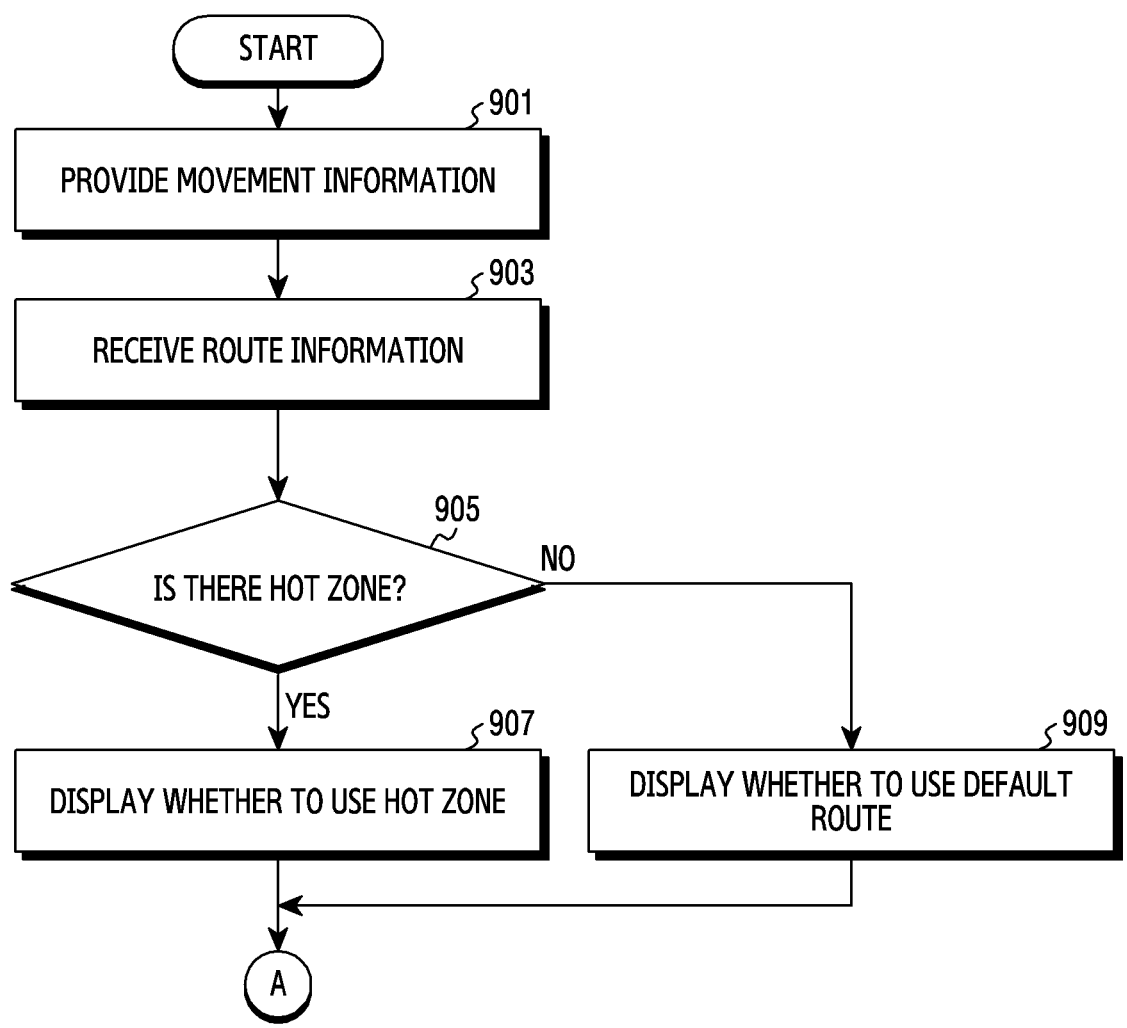
FIG. 9A and FIG. 9B illustrate flowcharts of the electronic device for movement according to various embodiments of the disclosure.
Figure 9B:
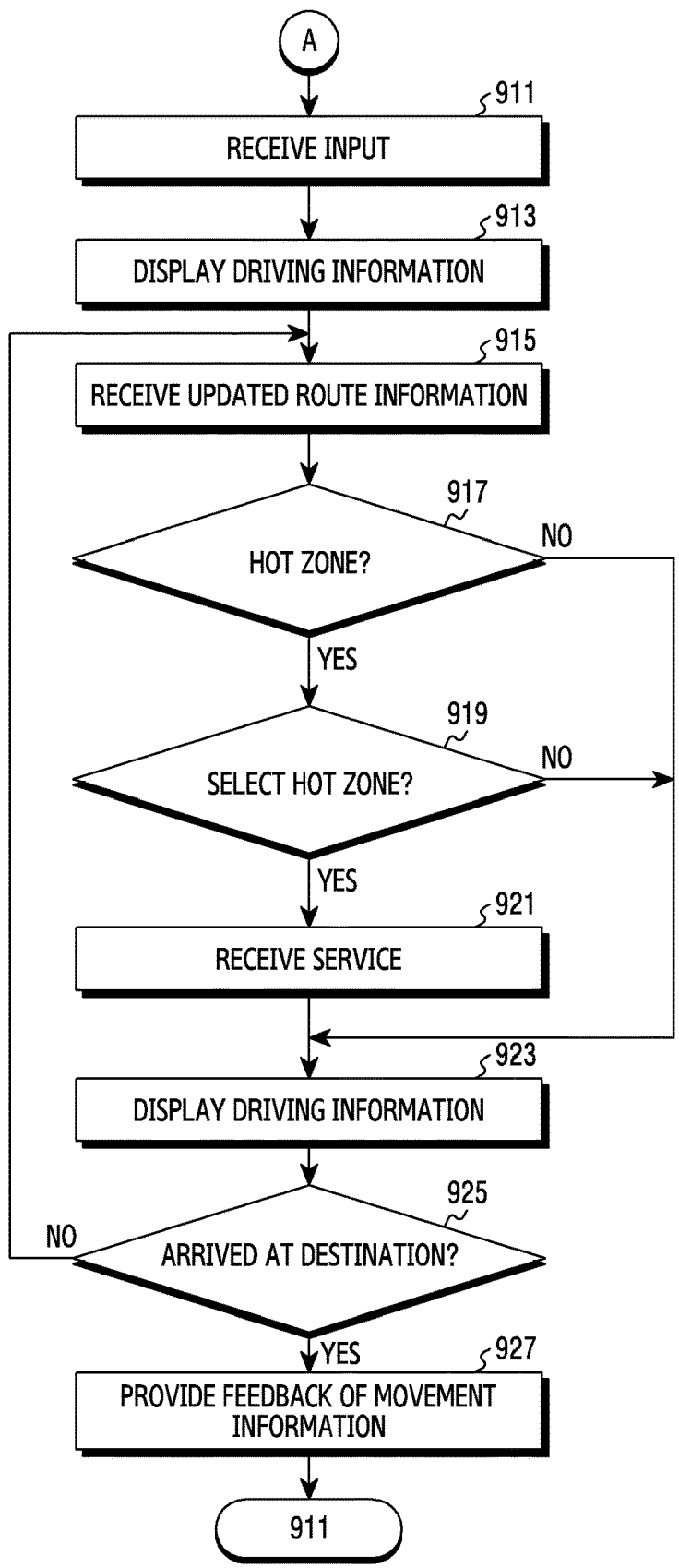

FIG. 9A and FIG. 9B illustrate flowcharts of the electronic device for movement according to various embodiments of the disclosure. FIG. 9A and FIG. 9B illustrate an operation method of the electronic device 120.

Referring to FIG. 9A and FIG. 9B, in operation 901, the electronic device may provide movement information to a management device. The movement information includes information related to driving of the electronic device. The movement information corresponds to the movement information in operation 801 of FIG. 8. The electronic device may receive a user input to generate movement information. For example, the electronic device may display a UI for configuration of a destination. The electronic device may detect a user input and determine the destination. The electronic device may provide movement information including information on the destination to the management device.

In operation 903, the electronic device may receive route information. The route information corresponds to the route information provided in the first cycle of operation 811 of FIG. 8. The route information may include a service route determined by the management device according to the movement information. Additionally, the route information may include driving information for guiding of the service route.

In operation 905, the electronic device may determine the presence or absence of a hot zone. The electronic device may determine whether a hot zone is included in the service route indicated by the route information. If a hot zone is included in the service route, the electronic device may perform operation 907. If a hot zone is not included in the service route, the electronic device may perform operation 909.

In operation 907, the electronic device may indicate whether to use the hot zone. Since the service route includes the hot zone, the electronic device may display whether or not to use the hot zone, so that a user makes a final selection of whether to drive using the hot zone, or whether to drive using a normal route (a route determined without considering the hot zone). For example, the electronic device may display, on a navigation application, a UI for inquiring of whether to use a route including the hot zone, that is, whether to use a hot zone-based route, or to use a default route.

In operation 909, the electronic device may display whether to use the default route. Since the service route does not include a hot zone, the user does not need to select whether to use the hot zone. Therefore, unlike operation 907, the electronic device may display only whether to use the default route. For example, the electronic device may display, on the navigation application, a UI inquiring of whether to start driving using the default route.

In operation 911, the electronic device may receive a user input. By receiving the user input, the electronic device may determine whether to perform driving through a route to which an intention of the user has been provided. Hereinafter, a procedure described below is described on an assumption in which driving is performed through the route to which the intention of the user has been provided.

Additionally, after operation 907, when performing operation 911, the electronic device may detect the user input, thereby confirming a selection result as to whether or not the user will use the hot zone. If the user input indicates use of the default route, the electronic device may determine not to use the hot zone during driving of the electronic device. Conversely, when the user input indicates use of the hot zone-based route, the electronic device may determine to use the hot zone during driving of the electronic device.

In operation 913, the electronic device may display driving information. The electronic device may display driving information for guiding a vehicle on which the electronic device is mounted, a vehicle operated by the user of the electronic device, or the user of the electronic device to move according to the service route. For example, the electronic device may provide at least one of a visual UI or a voice guidance service for guiding a route. The electronic device displays driving information for the default route or displays driving information for the hot zone-based route, according to the user input in operation 911.

According to various embodiments, the electronic device may display, as information using HD map information, information on lanes, information relating to a recommended speed for each lane, and terrain information (e.g., a bridge, a slope, a bus lane, etc.) related to a specific lane. The electronic device may receive lane information, speed information, and the like, as well as existing driving information, on the navigation system. By acquiring high-capacity information via the hot zone, the electronic device may display optimal lane information or optimal speed information on the route from the source to the destination. Additionally, the electronic device may include lane or speed-related information together with a route according to the operation mode (e.g., a high speed mode, a fuel efficiency mode, or a safety mode) described above in FIG. 5B.

In operation 915, the management device may receive updated route information. The electronic device may receive the updated route information from the management device. The updated route information may be route information that is updated based on traffic information and cell information which are updated by the management device in real time.

In operation 917, the electronic device may determine whether a current location is a hot zone. The electronic device may determine whether the electronic device enters the hot zone. If the electronic device enters the hot zone, the electronic device may perform operation 919. If the electronic device does not enter the hot zone, the electronic device may perform operation 923.

In operation 919, the electronic device may determine whether to use the hot zone. According to various embodiments, the electronic device has determined whether to use the hot zone in operation 911. In operation 911, if the hot zone is included in the service route, and the user input indicates to use the hot zone-based route, the electronic device may determine to use the hot zone. Conversely, if the hot zone is not included in the service route, or if the user input indicates to use the default route, the electronic device may determine not to use the hot zone.

Additionally, the electronic device may display a message for asking the user whether to use the hot zone. Thereafter, the electronic device may perform the determination of operation 919 according to the user input. If the hot zone-based route is not used, the electronic device may display the message and may determine, based on the message, whether to use the hot zone-based route.

In operation 921, the electronic device may receive a service. The electronic device may receive a hot zone service. For example, the hot zone service may be downloading of high quality video data. For another example, the hot zone service may be reception of high capacity map information (e.g., three-dimensional (3D) map information or HID map information). For another example, the hot zone service may be uploading of high capacity data.

In operation 923, the electronic device may display driving information. Operation 923 corresponds to operation 913, and descriptions of overlapping configurations are omitted.

In operation 925, the electronic device may determine whether the electronic device has arrived at the destination. The electronic device may determine whether the current location is the destination configured in operation 901. The electronic device may determine whether the electronic device has arrived at the destination, by comparing current location information of the electronic device with location information of the destination, which is obtained when the movement information is generated. The electronic device may perform operation 927 if it is determined that the electronic device has arrived at the destination. If it is not determined that the electronic device has arrived at the destination, the electronic device may perform operation 913 again.

In operation 927, the electronic device may feed back a movement result. The movement result may include a driving record (e.g., a movement speed and a movement route) and a user input history. The electronic device may transmit the movement result to another device. For example, the electronic device may store the movement result in a cloud system that manages traffic information. For example, the electronic device may transmit the movement result to a server that manages personal preferences of the user.

Although not illustrated in FIG. 9A and FIG. 9B, the electronic device may exchange and update driving information with a base station (e.g., a hot zone) in real time. In other words, the driving-related information is not only transmitted to the management device or the base station only in specific operations (e.g., operation 911, operation 915, operation 921, or operation 927) of FIG. 9A and FIG. 9B, but also transmitted or received between operations (e.g., between operation 921 and operation 923) or within a specific operation (e.g., operation 915). Further, an ultra-low latency service between a moving electronic device and a network may be performed via an MEC function, etc. Since movement information of the electronic device is shared in real time, the network is regularly established, so that a seamless handover between base stations may be achieved.

Figure 10:
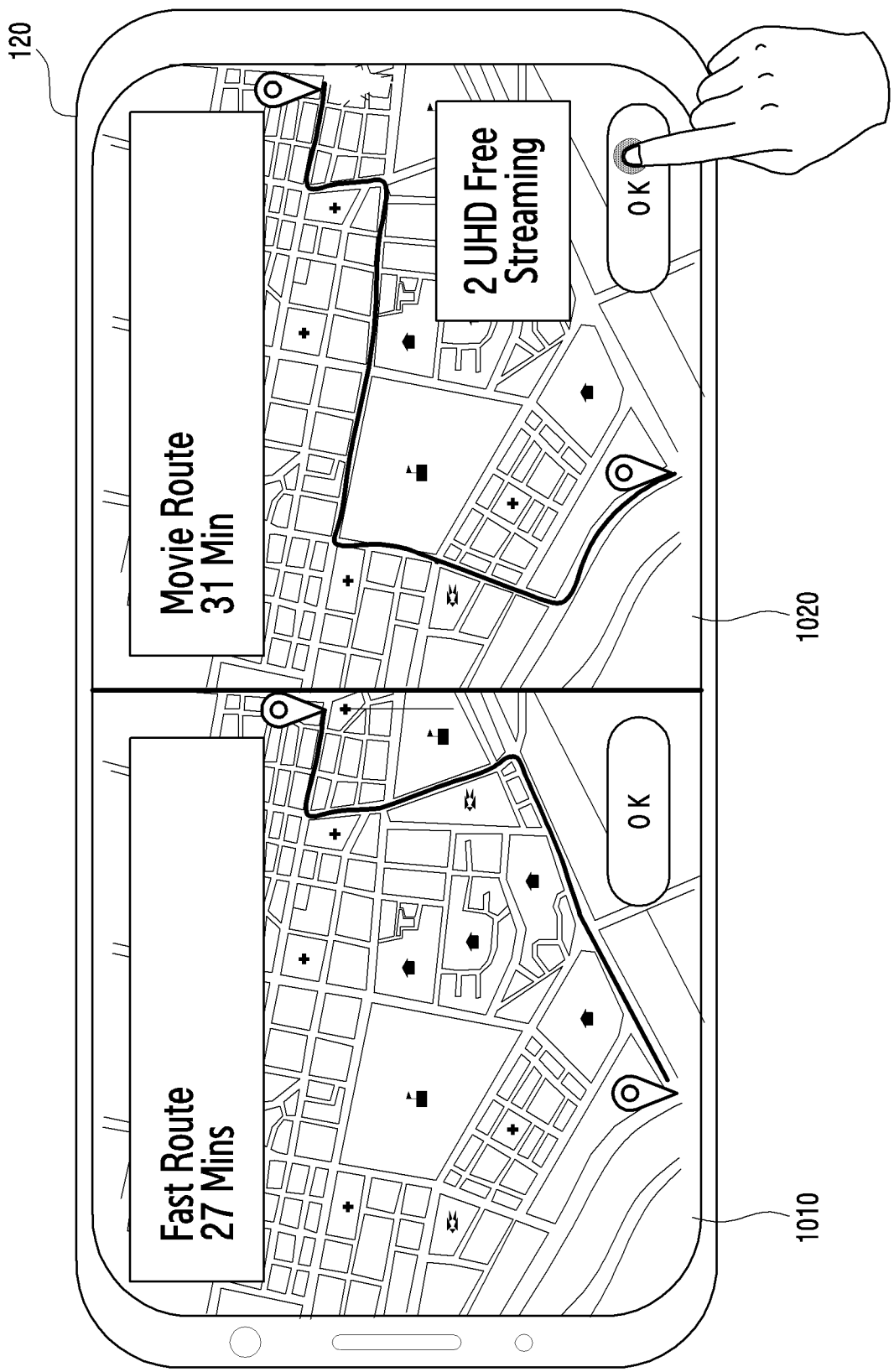
FIG. 10 illustrates an example of providing a route according to various embodiments of the disclosure.

FIG. 10 illustrates an example of providing a route according to various embodiments of the disclosure. FIG. 10 illustrates provision of a route of the electronic device 120.

Referring to FIG. 10, the electronic device 120 provides a shortest route 1010 as a default route and a movie route 1020 as a service route. The movie route refers to a service route for receiving a movie service. The service route may be determined according to at least one of a type of service that a user intends to receive while driving, a required amount of data, and a data rate. In FIG. 10, a user of the electronic device 120 may intend to receive the movie service while driving. The intention of the user may be confirmed by receiving a user input for the movie service via the electronic device 120 or by receiving, in a management device (not illustrated), preference information for the user of the electronic device 120 from a big data server.

The electronic device 120 may display a UI for asking whether to drive through the shortest route 1010 or to drive through the movie route 1020. The UI may include an estimated time required for each route. For example, the UI may display 27 minutes as a time required for the shortest route 1010 and may display 31 minutes as a time required for the movie route 1020.

The electronic device 120 may determine one of the shortest route 1010 or the movie route 1020 via detection of the user input. For example, if the electronic device 120 detects an input for the shortest route 1010, the electronic device 120 may display driving information for movement from a source to a destination without a service by a hot zone. For another example, if the electronic device 120 detects an input for the movie route 1020, the electronic device 120 may display driving information for movement from the source to the destination while being provided with the service by a hot zone.

Additionally, a mobile communication operator may provide a promotion to a user going through a hot zone. The electronic device 120 may display information related to the promotion together with a screen of the movie route 1020. For example, the electronic device 120 may display information indicating that a data usage fee for two UHD videos is free.

According to various embodiments, as shown in the movie route 1020, by displaying the service route going through the hot zone, whether to determine the service route of the disclosure may be confirmed. Further, on a map application or a navigation application, information on an area of the hot zone is displayed, so that whether to determine the service route of the disclosure may be confirmed.

Figure 11:
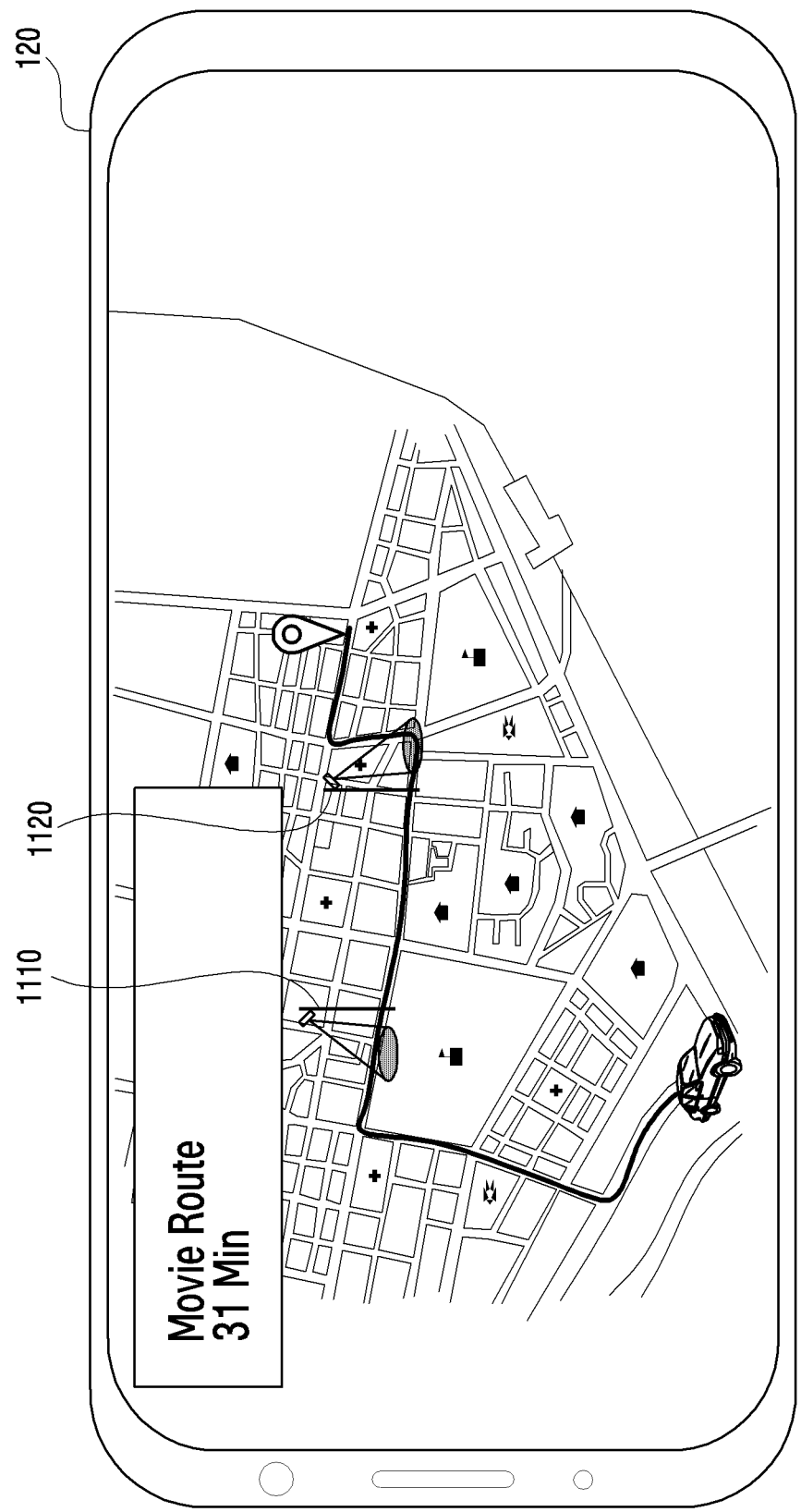
FIG. 11 illustrates an example of providing a service according to various embodiments of the disclosure.

FIG. 11 illustrates an example of providing a service according to various embodiments of the disclosure.

Referring to FIG. 11, the electronic device 120 moves along a service route according to the movie route 1020 of FIG. 10. The movie route 1020 may include two hot zones. The electronic device 120 may download a first UHD video in a first hot zone 1110 and may download a second UHD video in a second hot zone 1120, according to a promotion of a mobile communication operator.

According to various embodiments, as shown in service information for the hot zones displayed on the electronic device 120, whether to determine the service route of the disclosure may be confirmed by the electronic device 120 receiving a service displayed in the hot zones on the service route.

Figure 12:
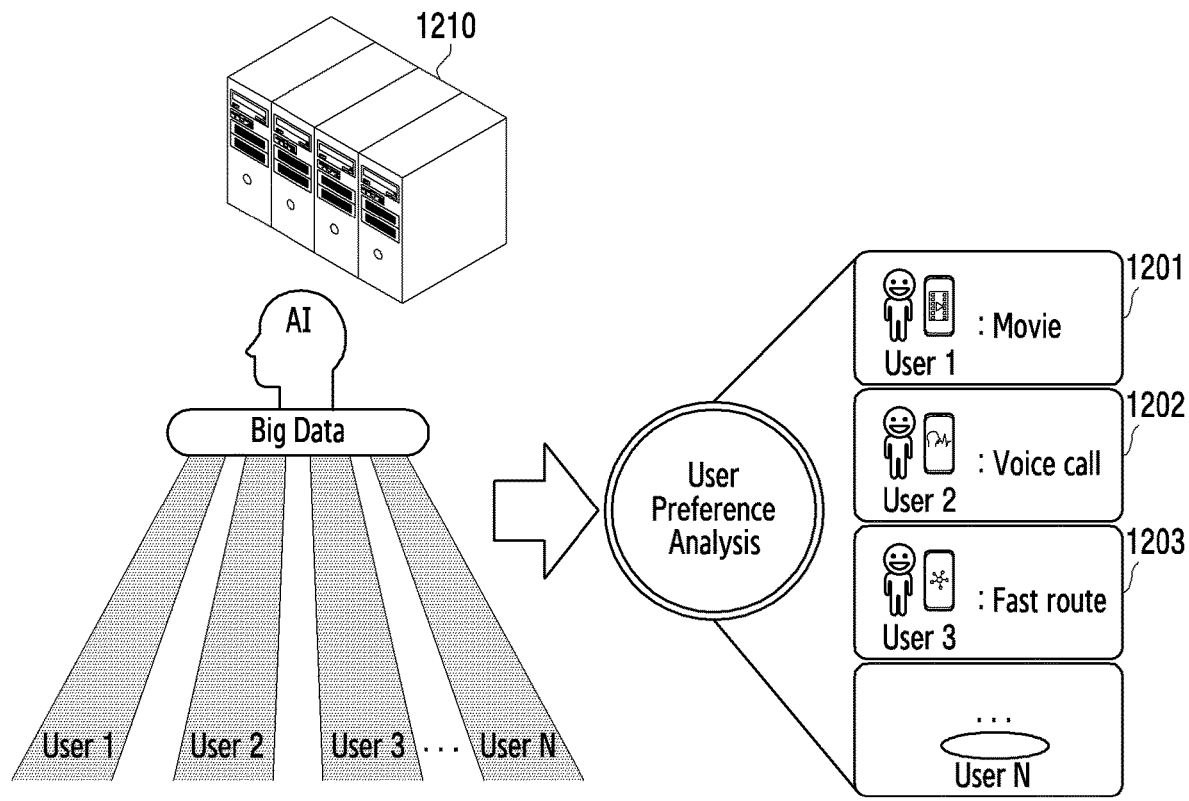
FIG. 12 illustrates an example of providing a route based on a mode selection for each user according to various embodiments of the disclosure.

FIG. 12 illustrates an example of providing a route based on a mode selection for each user according to various embodiments of the disclosure. Here, a mode is specified according to a service when a route is determined. If the service requires high data throughput, the mode may be configured to provide a hot zone having a high data transmission rate, and if the service requires a real-time service, the mode may be configured so that capacity of each of cells in the service route is greater than or equal to a threshold value according to cell deployment information.

Referring to FIG. 12, a big data server 1210 may store information for determination of a mode for each user. Whether a short distance route is desired, high data throughput is desired, or a seamless service is desired may vary depending on user preferences. Whether to bypass an accident-prone area, whether to use a route having good fuel efficiency, or the like may also vary according to user preferences. The big data server 1210 may include training data for determination of a mode, from user #1 to user #N. The big data server 1210 may determine a preference mode for each user, based on probabilities and weights from multiple pieces of training data for each user.

If a preference mode of a first user 1201 is a movie mode and requires high data throughput, the big data server 1210 may determine a service route to include a hot zone that provides a high data transmission rate, or may control a management server or an electronic device so as to configure the service route to be a default route.

If a preference mode of a second user 1202 is a call mode and requires more of real-time performance, the big data server 1210 may determine a service route so that capacities of all respective cells within the service route to be greater than or equal to a threshold value, or may control the management server or the electronic device so as to configure the service route to be the default route.

If a preference mode of a third user 1203 is a shortest route mode and preferentially requires to shorten a movement time, the big data server 1210 may determine a service route without considering the presence or absence of a hot zone, or may control the management server or the electronic device so as to configure the shortest route to be the default route.

Although not illustrated in FIG. 12, the big data server 1210 may control the management server or the electronic device to configure a route according to at least one of a high speed mode, a fuel efficiency mode, and a safety mode, as an operation mode of the electronic device. For example, if the big data server 1210 is in the safety mode, the big data server 1210 may control the management server or the electronic device so as to configure a route in which accident occurrence rate statistics of each section in the route is lowest.

Figure 13:
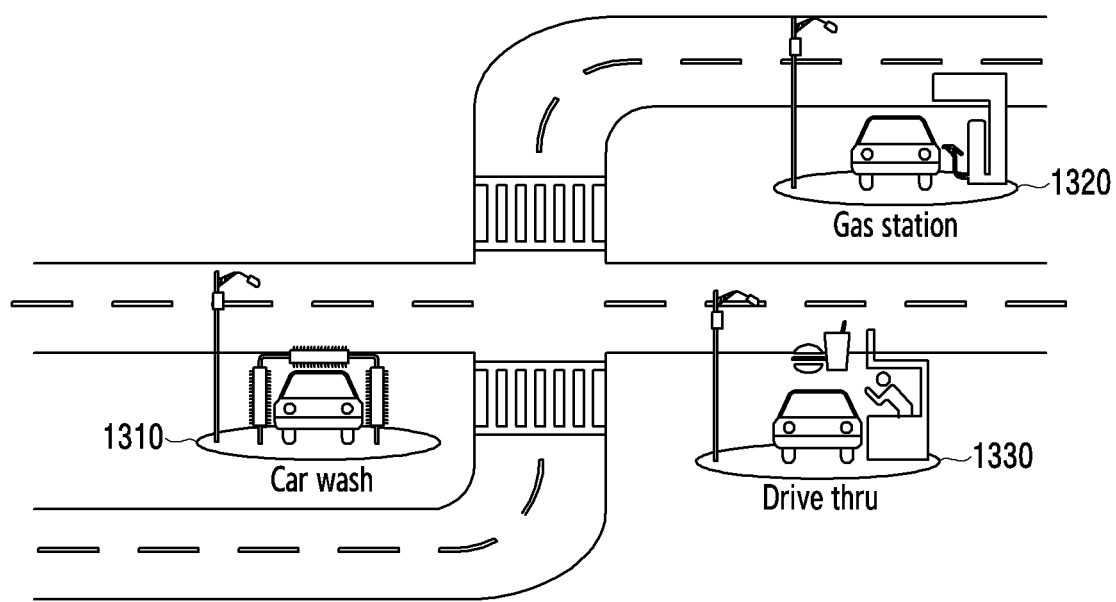
FIG. 13 illustrates an example of a hot zone according to various embodiments of the disclosure.

FIG. 13 illustrates an example of a hot zone according to various embodiments of the disclosure.

Referring to FIG. 13, a hot zone may be located in various areas. For example, a hot zone may be a car wash 1310. For example, a hot zone may be a gas station 1320. For example, a hot zone may be a drive-thru 1330. Although not illustrated in FIG. 13, a hot zone may be an intersection.

Cellular networks provided in hot zones are the same, so that a difference between data transmission rates may be small, but lengths of stay time in the hot zones may be different for respective types of the hot zones. For example, a stay time of a user at the gas station 1320 may be longer than the stay time of the user at the drive-thru 1330.

Accordingly, a time (hereinafter, a duration) in which a cellular network service may be sustained by the electronic device staying in a hot zone may be a factor for determination of whether the service can be provided according to a user requirement for a specific route.

According to various embodiments, if a plurality of hot zones are included in a search route, a management device may determine a service route having a channel capacity capable of processing capacity of the entire service to be provided to the electronic device, on the basis of a duration for a user of the electronic device according to a hot zone type or an average duration for normal users in a corresponding hot zone.

Figure 14:
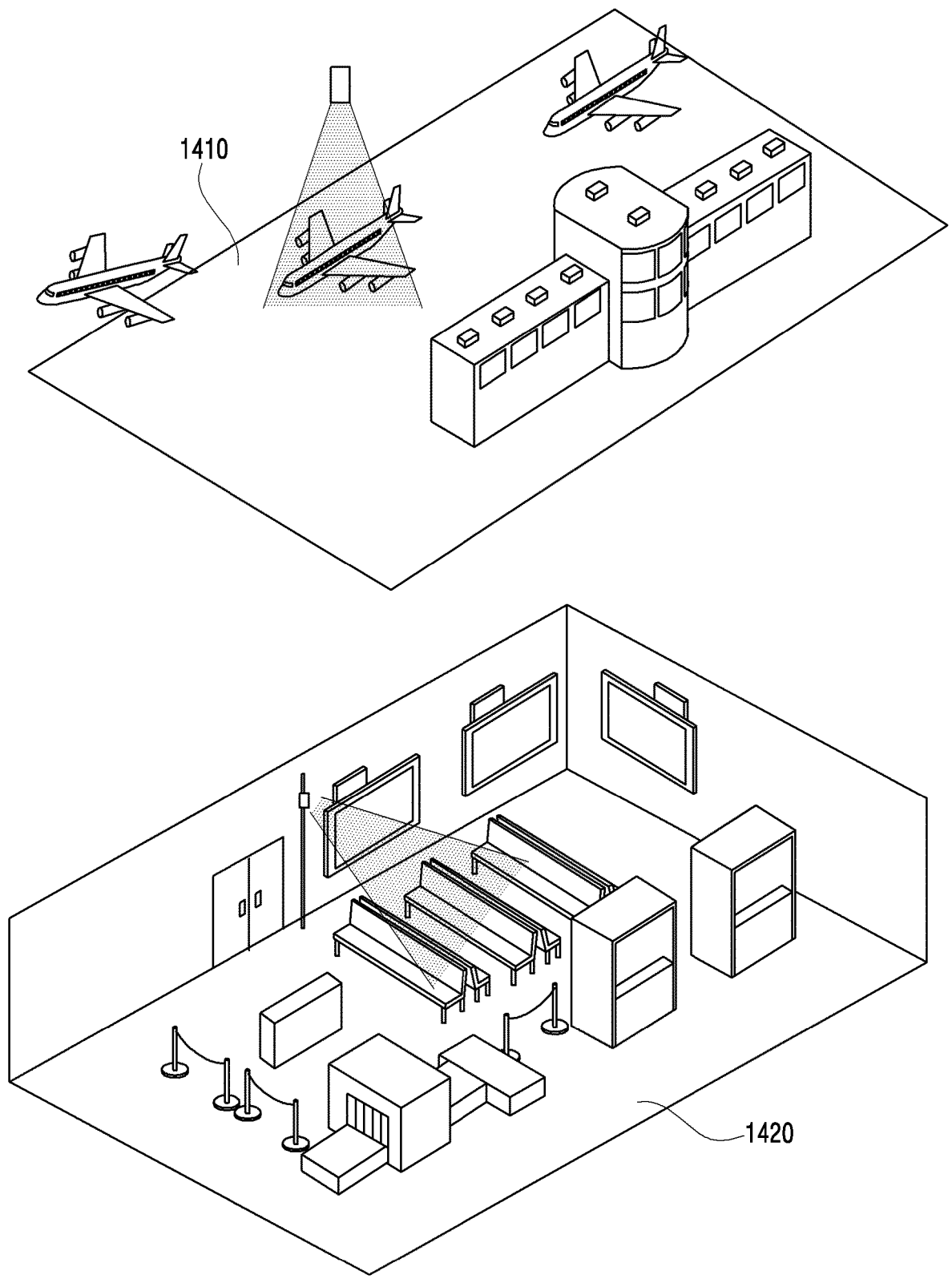
FIG. 14 illustrates another example of the hot zone according to various embodiments of the disclosure.

FIG. 14 illustrates another example of the hot zone according to various embodiments of the disclosure.

Referring to FIG. 14, a hot zone may be located in various areas. For example, a hot zone may be an aviation maintenance zone 1410. For another example, a hot zone may be an airport gate 1420.

A range of information that can be provided in each hot zone may be different for each location of the hot zone. For example, the number of electronic devices connected to a hot zone in the aviation maintenance area 1410 may be less than the number of electronic devices connected to a hot zone in the airport gate 1420. Due to a small number of electronic devices connected to a cell, the available channel capacity of the aviation maintenance area 1410 may be relatively larger than the available channel capacity of the airport gate 1420. For example, an electronic device at the airport gate 1420 may receive a high-capacity video file. An electronic device in the aviation maintenance area 1410 may receive an elevation program update or receive route information, and may receive in-flight entertainment contents or receive 3D map information.

The disclosure provides a user-specialized hot zone service by determining and recommending a service route by using cellular network information. In the disclosure, a situation, in which a driving route of a vehicle is configured based on service information, cell information, and traffic information, is described as an example, but the disclosure is not limited to a vehicle system. A route providing technique of the disclosure may be applied even when a user carries an electronic device and moves by walking or by using other means of transportation, such as a bicycle.

The disclosure describes the route providing technique as an example, in which a management server that controls a route configuration, such as a navigation system, configures a service route and provides the service route to an electronic device, but the disclosure is not limited thereto. According to various embodiments, the electronic device may receive cell information, traffic information, etc. and may directly calculate and determine a service route based on the received information. By adding an MEC device as an entity adjacent to a base station, computational and processing operations of the disclosure may be efficiently performed.

In the disclosure, in consideration of cell requirements, data rate, channel capacity, throughput, data amount, etc., acquisition of a channel quality may be required. The channel quality may be at least one of a beam reference signal received power (BRSRP), a reference signal received power (RSRP), a reference signal received quality (RSRQ), a received signal strength indicator (RSRI), a signal to interference and noise ratio (SINR), a carrier to interference and noise ratio (CINR), a signal to noise ratio (SNR), an error vector magnitude (EVM), a bit error rate (BER), and a block error rate (BLER). In addition to the above described examples, other terms having equivalent technical meanings or other metrics indicating a channel quality may be used.

In the disclosure, the expression "equal to or greater than" or "equal to or less than" is used to determine whether a specific condition is satisfied (fulfilled), but this is merely a description to represent an example and does not exclude "exceeding" or "less than". The description of conditions "equal to or greater than" may be replaced with "exceeding", the description of conditions "equal to or less than" may be replaced with "less than", and the description of conditions "equal to or greater than and less than" may be replaced with "exceeding and equal to or less than".

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

The invention claimed is:

1. A management device for providing a route in a wireless communication system, the management device comprising:

at least one transceiver; and
at least one processor operatively coupled to the at least one transceiver,
wherein the at least one processor is configured to:
receive service information related to a service to be provided to an electronic device,
receive cell information related to at least one second cell provided by a second cellular network,
configure a first route, wherein at least one first cell of the first route is provided by a first cellular network,
identify whether the first route is a safety route satisfying a safety condition, based on information on an accident for the first route,
configure, based on the identifying that the first route is not the safety route, one or more second routes as a route satisfying an allowable range expressed as a time limit value indicating an allowable excess time compared to a driving time of the first route, based on the service information and the cell information, wherein each of one or more second route comprises the at least one second cell,
identify one or more safety routes satisfying the safety condition among the one or more second routes based on information on an accident for each of the one or more second routes,
identify a service route among the one or more safety routes, based on the first route and a range for comparing to the first route included in the service information, and
provide the service route to the electronic device,
wherein the allowable range is included in the service information,
wherein the information on the accident for the first route includes information on an accident occurrence rate, a type of the accident, and an extent of the accident for the first route, and
wherein the information on the accident for each of one or more second route includes information on an accident occurrence rate, a type of the accident, and an extent of the accident for one or more second route.

2. The management device of claim 1, wherein the at least one second cell provides a higher data rate for the service than the at least one first cell of the first route.

3. The management device of claim 1, wherein, in order to provide the service route, the at least one processor is further configured to:
among a plurality of routes for a source and a destination of the electronic device, identify a route which comprises the at least one second cell and has a smallest difference from a shortest route according to the source and the destination, and
determine the identified route as the service route.

4. The management device of claim 1,
wherein the at least one processor is further configured to receive movement information comprising a source and a destination from the electronic device, and
wherein a start point and an end point of the service route are the source and the destination, respectively.

5. The management device of claim 4, wherein, in order to determine the service route, the at least one processor is further configured to:
determine a shortest route according to the source and the destination,
determine whether the shortest route comprises the at least one second cell, and
if the shortest route does not comprise the at least one second cell, determine the service route.

6. The management device of claim 5, wherein, in order to determine the service route, the at least one processor is further configured to:
determine a second required time larger, by a certain value, than a first required time that is required from the source to the destination when the shortest route is used, and
determine, as the service route, a route comprising the at least one second cell from among at least one route in which the second required time is required from the source to the destination, wherein the certain value is smaller than a limit value included in the service information.

7. The management device of claim 1,
wherein an amount of data derived based on a shortest route according to a source and a destination of the electronic device is smaller than an amount of data for the service, and
wherein the amount of data derived based on the service route is larger than the amount of data for the service.

8. The management device of claim 1,
wherein the cell information comprises information on a plurality of cells located within an area related to a source and a destination of the electronic device, and
wherein the information on the plurality of cells comprises deployment information on second cells and cells provided by the first cellular network, which comprise the first cell, from among the plurality of cells, and capacity information on available channel capacities of the second cells and the cells provided by the first cellular network, respectively.

9. A method performed by a management device in a wireless communication system, the method comprising:
receiving service information related to a service to be provided to an electronic device;
receiving cell information related to at least one second cell provided by a second cellular network;
configuring a first route, wherein at least one first cell of the first route is provided by a first cellular network,
identifying whether the first route is a safety route satisfying a safety condition, based on information on an accident for the first route,
configuring, based on the identifying that the first route is not the safety route, one or more second routes as a route satisfying an allowable range expressed as a time limit value indicating an allowable excess time compared to a driving time of the first route, based on the service information and the cell information, wherein each of one or more second route comprises the at least one second cell;
identifying one or more safety routes satisfying the safety condition among the one or more second routes based on information on an accident for each of the one or more second routes;
identifying a service route among the one or more safety routes, based on the first route and a range for comparing to the first route included in the service information; and
providing the service route to the electronic device,
wherein the allowable range is included in the service information,
wherein the information on the accident for the first route includes information on an accident occurrence rate, a type of the accident, and an extent of the accident for the first route, and
wherein the information on the accident for each of one or more second route includes information on an accident occurrence rate, a type of the accident, and an extent of the accident for one or more second route.

10. The method of claim 9, wherein the at least one second cell provides a higher data rate for the service than at least one first cell of the first route.

11. The method of claim 9, wherein the providing of the service route comprises:
among a plurality of routes for a source and a destination of the electronic device, identifying a route which comprises the at least one second cell and has a smallest difference from a shortest route according to the source and the destination; and
determining the identified route as the service route.

12. The method of claim 9, further comprising:
receiving movement information comprising a source and a destination from the electronic device,
wherein a start point and an end point of the service route are the source and the destination, respectively.

13. The method of claim 12, wherein determining of the service route comprises:
determining a shortest route according to the source and the destination;
determining whether the shortest route comprises the at least one second cell; and
if the shortest route does not comprise the at least one second cell, determining the service route.

14. The method of claim 13, wherein the determining of the service route further comprises:
determining a second required time larger, by a certain value, than a first required time that is required from the source to the destination when the shortest route is used; and
determining, as the service route, a route comprising the at least one second cell from among at least one route in which the second required time is required from the source to the destination,
wherein the certain value is smaller than a limit value included in the service information.

* * * * *